(12) United States Patent
Moon et al.

(10) Patent No.: US 11,882,315 B2
(45) Date of Patent: Jan. 23, 2024

(54) METHOD AND APPARATUS FOR ENCODING/DECODING IMAGE

(71) Applicant: INDUSTRY ACADEMY COOPERATION FOUNDATION OF SEJONG UNIVERSITY, Seoul (KR)

(72) Inventors: Joo Hee Moon, Seoul (KR); Jae Min Ha, Incheon (KR); Dong Jae Won, Goyang-si (KR); Sung Won Lim, Seoul (KR)

(73) Assignee: INDUSTRY ACADEMY COOPERATION FOUNDATION OF SEJONG UNIVERSITY, Seoul (KR)

(*) Notice: Subject to any disclaimer, the term of this patent is extended or adjusted under 35 U.S.C. 154(b) by 0 days.

(21) Appl. No.: 17/857,470

(22) Filed: Jul. 5, 2022

(65) Prior Publication Data
US 2022/0400294 A1    Dec. 15, 2022

Related U.S. Application Data

(63) Continuation of application No. 16/482,457, filed as application No. PCT/KR2018/001341 on Jan. 31, 2018, now Pat. No. 11,425,426.

(30) Foreign Application Priority Data

Jan. 31, 2017  (KR) .................. 10-2017-0013637
Jan. 19, 2018  (KR) .................. 10-2018-0007285

(51) Int. Cl.
*H04N 19/91*  (2014.01)
*H04N 19/132*  (2014.01)
(Continued)

(52) U.S. Cl.
CPC ........... *H04N 19/91* (2014.11); *H04N 19/132* (2014.11); *H04N 19/176* (2014.11); *H04N 19/60* (2014.11)

(58) Field of Classification Search
None
See application file for complete search history.

(56) References Cited

U.S. PATENT DOCUMENTS 5,351,085 A    9/1994  Coelho et al.
9,106,913 B2   8/2015  Rojals et al.
(Continued)

FOREIGN PATENT DOCUMENTS

CN    102186087 A    9/2011
CN    102197651 A    9/2011
(Continued)

OTHER PUBLICATIONS

Notice of Allowance from Chinese Application No. 201770009395.8 dated May 30, 2022.
(Continued)

*Primary Examiner* — Christopher Braniff
(74) *Attorney, Agent, or Firm* — Dilworth & Barrese, Esq.; Michael J. Musella, Esq.

(57) ABSTRACT

The present invention relates to an image encoding/decoding method and device, and the image encoding method or device according to an embodiment of the present invention may encode a position of a reference coefficient within a current transform block to be encoded, and encoding skip region information of a skip region selected on the basis of the position of the reference coefficient. The skip region information may represent whether or not coefficients within the skip region have an identical coefficient value.

7 Claims, 31 Drawing Sheets

(51) Int. Cl.
  *H04N 19/176* (2014.01)
  *H04N 19/60* (2014.01)

(56) References Cited

U.S. PATENT DOCUMENTS

| | | |
|---|---|---|
| 9,179,151 B2 | 11/2015 | Bultje et al. |
| 2005/0123207 A1 | 6/2005 | Marpe et al. |
| 2009/0016440 A1 | 1/2009 | Tian et al. |
| 2009/0232204 A1* | 9/2009 | Lee .................. H04N 19/146 |
| | | 375/E7.076 |
| 2012/0207400 A1 | 8/2012 | Sasai et al. |
| 2013/0003858 A1* | 1/2013 | Sze .................. H04N 19/61 |
| | | 375/240.18 |
| 2013/0114730 A1 | 5/2013 | Joshi et al. |
| 2013/0300591 A1 | 11/2013 | Marpe et al. |
| 2014/0003488 A1 | 1/2014 | Ji et al. |
| 2014/0307801 A1 | 10/2014 | Ikai et al. |
| 2015/0110199 A1 | 4/2015 | Ikai et al. |
| 2015/0181237 A1 | 6/2015 | Tsukuba et al. |
| 2016/0227252 A1 | 8/2016 | Gamei et al. |

FOREIGN PATENT DOCUMENTS

| | | |
|---|---|---|
| CN | 102771125 A | 11/2012 |
| CN | 102893608 A | 1/2013 |
| CN | 103718554 A | 4/2014 |
| CN | 103907349 A | 7/2014 |
| CN | 104380737 A | 2/2015 |
| JP | 2014-527358 A | 10/2014 |
| JP | 2015-533061 A | 11/2015 |
| KR | 10-1356733 B1 | 2/2014 |
| KR | 10-2016-0038063 A | 4/2016 |
| KR | 10-1656964 B1 | 9/2016 |
| KR | 10-1656965 B | 9/2016 |
| KR | 10-2016-0116006 A | 10/2016 |
| WO | 2011128303 A2 | 10/2011 |
| WO | 2012108205 A1 | 8/2012 |
| WO | 2013022748 A1 | 2/2013 |
| WO | 2013065702 A1 | 5/2013 |
| WO | 2013070707 A1 | 5/2013 |
| WO | 2013114992 A1 | 8/2013 |

OTHER PUBLICATIONS

Min, Junghye et al., "Adaptive significance map coding for large transform." Joint Collaborative Team on Video Coding, Document: JCTVC-F598. 2011 (pp. 1-3).
Extended European Search Report dated Jul. 3, 2020 for corresponding European Patent Application No. 18747331.9.
Chinese Office Action dated Jan. 13, 2022, in the corresponding Chinese Patent Application No. 201880009395.8 (8 pages in English and 6 pages in Chinese).
Japan Office Action dated Feb. 15, 2022, in the corresponding Japanese Patent Application No. 2019-541229 (6 pages in Japanese).
Liang Zhao et al. "Improved Intra Transform Skip Mode in HEVC" 2013 IEEE International Conference on Image Processing, pp. 2010-2014 (5 pages in English).
Piao, Yinji et al. "Adaptive significance map coding for large transform", Joint Collaborative Team on Video Coding (JCT-VC) of ITU-T SG16 WP 3 and ISO/IEG JTC1/SC29/WG11 6th Meeting: Torino, IT, Jul. 14-22, 2011, [JCTVC-F598] (4 pages in English).
International Search Report dated May 28, 2018 in corresponding International Application No. PCT/KR2018/001341 (5 pages in English, 5 pages in Korean).
Office Action dated Jul. 18, 2023 in Japanese Appln. No. 2022-078472.
Extended European search report dated Oct. 26, 2023, issued for the corresponding European Patent Application No. 23195330.8.

* cited by examiner diagonal reserve scan order

FIG. 15A

| 10 | −3 | −2 | 1 | −2 | 0 | 0 | 0 |
|---|---|---|---|---|---|---|---|
| 3 | −2 | 1 | 0 | 0 | 0 | 0 | 0 |
| 1 | 1 |  |  | 0 | 0 | 0 | 0 |
| 1 |  |  | 0 | 0 | 0 | 0 | 0 |
| 1 |  | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

FIG. 15C

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 90 | 82 | 76 | 74 | 69 | 66 | 64 | 59 | 54 | 53 | 41 | 30 | 20 | 10 |
| Prob of 0(%) | 5 | 9 | 10 | 18 | 24 | 26 | 31 | 34 | 36 | 41 | 46 | 47 | 59 | 70 | 80 | 90 |

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 91 | 87 | 81 | 76 | 71 | 68 | 63 | 60 | 55 | 51 | 48 | 43 | 41 | 30 | 20 | 10 |
| Prob of 0(%) | 9 | 13 | 19 | 24 | 29 | 32 | 37 | 40 | 45 | 49 | 52 | 57 | 59 | 70 | 80 | 90 |

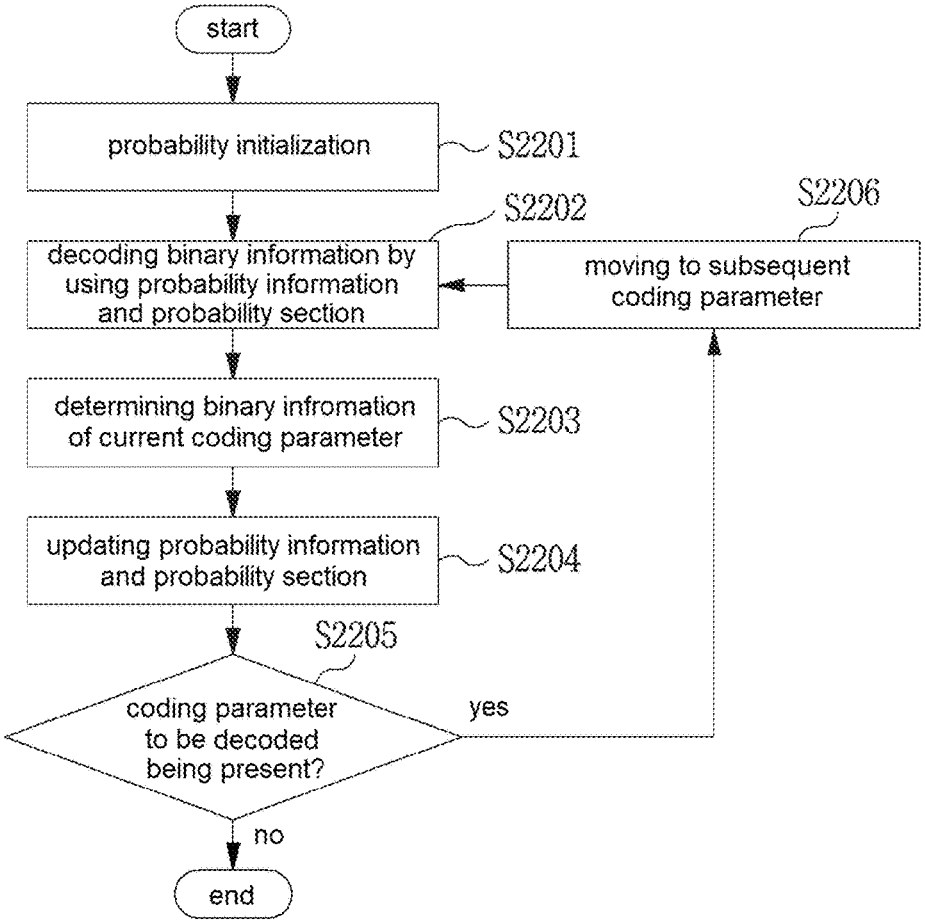

FIG. 26A

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

2600

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 90 | 82 | 76 | 74 | 69 | 66 | 64 | 59 | 54 | 53 | 41 | 30 | 20 | 10 |
| Prob of 0(%) | 5 | 9 | 10 | 18 | 24 | 26 | 31 | 34 | 36 | 41 | 46 | 47 | 59 | 70 | 80 | 90 |

2602

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 90 | 82 | 76 | 74 | 69 | 66 | 62 | 59 | 54 | 53 | 41 | 30 | 20 | 10 |
| Prob of 0(%) | 5 | 9 | 10 | 18 | 24 | 26 | 31 | 34 | 38 | 41 | 46 | 47 | 59 | 70 | 80 | 90 |

2603

3300 —
| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

3301 —
| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

3302 —
| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

METHOD AND APPARATUS FOR ENCODING/DECODING IMAGE

CROSS REFERENCE TO RELATED APPLICATIONS

This application is a Continuation of U.S. application Ser. No. 16/482,457 filed Jul. 31, 2019 which is a U.S. National Stage Application of International Application No. PCT/KR2018/001341, filed on Jan. 31, 2018, which claims the benefit under 35 USC 119(a) and 365(b) of Korean Patent Application No. 10-2017-0013637, filed on Jan. 31, 2017, and Korean Patent Application No. 10-2018-0007285, filed on Jan. 19, 2018, in the Korean Intellectual Property Office, the entire disclosures of which are incorporated herein by reference for all purposes.

TECHNICAL FIELD

The present invention relates to a method and device for encoding/decoding an image signal. More particularly, the present invention relates to entropy encoding and decoding.

BACKGROUND ART

Recently, demand for multimedia data such as video has rapidly increased on the Internet. However, the rate at which a bandwidth of a channel has developed is insufficient to keep up with the amount of multimedia data that has rapidly increased. Considering this situation, the Video Coding Expert Group (VCEG) of ITU-T and the Moving Picture Expert Group (MPEG) of ISO/IEC, which are part of the International Organization for Standardization, established High Efficiency Video Coding (HEVC) version 1, a video compression standard, in February 2014.

HEVC uses a variety of technologies such as intra-prediction, inter-prediction, transform, quantization, entropy encoding, and in-loop filtering. Information input for entropy encoding may be generated through various methods. As images or units of blocks input for encoding or decoding become large, an amount of data to be entropy encoded is rapidly increased.

DISCLOSURE

Technical Problem

In order to solve the above-described problems, the present invention has a main objective to provide an efficient entropy encoding and decoding method.

In addition, the present invention has another main objective to reduce an amount of coding data by performing entropy encoding or decoding using a skip region.

In addition, the present invention has still another main objective to improve arithmetic encoding and arithmetic decoding performance by effectively selecting probability information to be applied to encoding or decoding of each symbol when performing context-adaptive arithmetic encoding and decoding.

Technical Solution

An image encoding method or encoding device according to an embodiment of the present invention may encode a position of a reference coefficient within a current transform block to be encoded, and encode skip region information of a skip region selected on the basis of the position of the reference coefficient.

The skip region information may represent whether or not coefficients within the skip region have an identical coefficient value.

An image encoding method or encoding device according to another embodiment of the present invention may obtain binarized information by performing binarization for a value of a transform coefficient, and determine probability information to be applied to encoding of the binarized information according to a position of the transform coefficient within a transform block.

The probability information to be applied to encoding of the binarized information may be determined according to which region the transform coefficient is positioned within the transform block that is divided into a plurality of regions.

An image encoding method or encoding device according to still another embodiment of the present invention may encode a position of a reference coefficient within a current transform block to be encoded, encode skip region information of a skip region selected on the basis of the position of the reference coefficient, obtain binarized information by performing binarization for a value of a transform coefficient that is not included in the skip region, and select a probability information table to be applied to encoding of the binarized information among a plurality of probability information tables.

The probability information table to be applied to encoding of the binarized information may be selected according to whether or not the skip region is used when encoding the current transform block.

An image decoding method or decoding device according to an embodiment of the present invention may decode a position of a reference coefficient within a current transform block to be decoded, and decode skip region information of a skip region selected on the basis of the position of the reference coefficient.

The skip region information may represent whether or not coefficients within the skip region have an identical coefficient value.

An image decoding method or decoding device according to another embodiment of the present invention may obtain a value of an arithmetic encoded transform coefficient from a bitstream, and determine probability information to be applied to decoding of the arithmetic encoded transform coefficient according to a position of the transform coefficient within a transform block.

The probability information to be applied to decoding of the arithmetic encoded transform coefficient may be determined according to which region the transform coefficient is positioned within the transform block divided that is into a plurality of regions.

An image decoding method or decoding device according to still another embodiment of the present invention may decode a position of a reference coefficient within a current transform block to be decoded, decode skip region information of a skip region selected on the basis of the location of the reference coefficient, obtain an arithmetic encoded value of a transform coefficient that is not included in the skip region, and select a probability information table to be applied to decoding of the arithmetic encoded value of the transform coefficient among a plurality of probability information tables.

For the probability information table to be applied to decoding of the arithmetic encoded value of the transform coefficient, one of the plurality of probability information tables may be selected according to whether or not the skip region is used for decoding the current transform block.

A method of decoding an image according to an aspect of the present invention may include decoding a position of a reference coefficient within a current transform block, deriving probability information of a coding parameter on the basis of the position of the reference coefficient, and decoding the coding parameter by using the derived probability information.

In the image decoding method, the reference coefficient may be the first non-zero coefficient in an inverse scan order of coefficients within the current transform block.

In the image decoding method, the current transform block may be partitioned into a first region and a second region, and the probability information of the coding parameter may be determined on the basis of which region the reference coefficient is present in.

A method of decoding an image according to another aspect of the present invention may include decoding a partial piece of information of a DC coefficient of a current transform block, deriving probability information of a coding parameter on the basis of the partial piece of information of the DC coefficient, and decoding the coding parameter by using the derived probability information.

In the image decoding method, the DC coefficient may be a coefficient positioned at an upper left of the current transform block.

In the image decoding method, wherein the partial piece of information of the DC coefficient may be at least one piece of information for decoding the DC coefficient.

In the image decoding method, the method may further include: decoding a position of a reference coefficient within the current transform block, wherein the probability information of the coding parameter may be derived on the basis of distance information between the DC coefficient and the reference coefficient, and the partial piece of information of the DC coefficient.

A method of encoding an image according to an aspect of the present invention may include encoding a position of a reference coefficient within a current transform block, deriving probability information of a coding parameter on the basis of the position of the reference coefficient, and encoding the coding parameter by using the derived probability information.

In the image encoding method, the reference coefficient may be the first non-zero coefficient in an inverse scan order of coefficients within the current transform block.

In the image encoding method, the current transform block may be partitioned into a first region and a second region, and the probability information of the coding parameter may be determined on the basis of which region the reference coefficient is present in.

In the image encoding method, the method may include: encoding a partial piece of information of a DC coefficient of a current transform block, deriving probability information of a coding parameter on the basis of the partial piece of information of the DC coefficient, and encoding the coding parameter by using the derived probability information.

In the image encoding method, the DC coefficient may be a coefficient positioned at an upper left of the current transform block.

In the image encoding method, wherein the partial piece of information of the DC coefficient may be at least one piece of information for encoding the DC coefficient.

In the image encoding method, the method may further include encoding a position of a reference coefficient within the current transform block, wherein the probability information of the coding parameter may be derived on the basis of distance information between the DC coefficient and the reference coefficient, and the partial piece of information of the DC coefficient.

Advantageous Effects

According to the present invention, coding efficiency can be improved by reducing an amount of coding information generated by coding a video.

In addition, arithmetic encoding and arithmetic decoding performance can be improved by effectively selecting probability information to be applied to encoding or decoding of each symbol when performing context-adaptive arithmetic encoding and decoding.

Effects obtainable from the present invention may be non-limited by the above mentioned effect, and other unmentioned effects can be clearly understood from the following description by those having ordinary skill in the technical field to which the present invention pertains.

DESCRIPTION OF DRAWINGS

FIGS. 15*a* to 15*c* are views respectively showing examples where probability information is differently applied according to information of neighbouring coefficients.

FIG. 22 is a view of a flowchart showing a context-adaptive binary arithmetic decoding method according to an embodiment of the present invention.

FIGS. 23a and 23b are views respectively showing examples where probability information is differently applied according to information of neighbouring coefficients.

FIGS. 26a and 26b are views showing examples where probability information is differently applied according to information of neighbouring coefficients.

MODE FOR INVENTION

Figure 1:
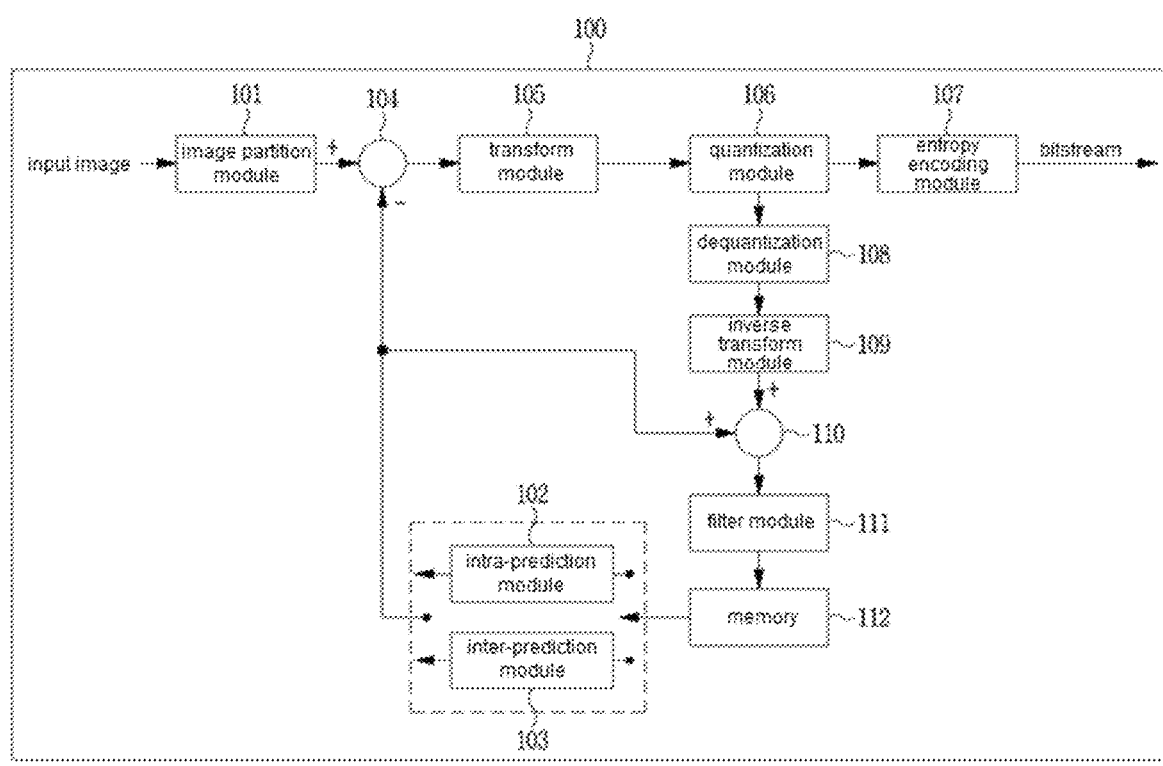
FIG. 1 is a block diagram showing an image encoding device according to an embodiment of the present invention.

The present invention may be modified in various ways and implemented by various embodiments, so that specific embodiments are shown in the drawings and will be described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms "first", "second", etc. can be used to describe various elements, but the elements are not to be construed as being limited to the terms. The terms are only used to differentiate one element from other elements. For example, the first element may be named the second element without departing from the scope of the present invention, and similarly the second element may also be named the first element. The term and/or includes a combination of a plurality of items or any one of a plurality of terms.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it will be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. Hereinafter, the same elements in the drawings are denoted by the same reference numerals, and a repeated description of the same elements will be omitted.

FIG. 1 is a block diagram showing an image encoding device according to an embodiment of the present invention.

Referring to FIG. 1, an image encoding device 100 may include an image partition module 101, an intra-prediction module 102, an inter-prediction module 103, a subtractor 104, a transform module 105, a quantization module 106, an entropy encoding module 107, a dequantization module 108, an inverse transform module 109, an adder 110, a filter module 111, and a memory 112.

The elements in FIG. 1 are illustrated independently to denote mutually different characteristic functions in the image encoding device, and does not mean that each element is configured as separated hardware or a single software constituent unit. Namely, the elements are arranged as individual elements for the description purpose, and at least two of the elements may be incorporated into a single element or a single element may be divided into a plurality of elements to perform functions, and an embodiment in which elements are integrated or an embodiment in which an element is divided may be included in coverage of the present invention as long as it does not depart from the scope and spirit of the present invention.

In addition, some of the elements may be optional to simply improve performance, rather than essential ones performing an intrinsic function in the present invention. The present invention may be implemented by including only requisite elements for implementing the essence of the present invention, excluding element(s) used to merely enhance performance, and a structure including only the essential elements, excluding selective elements used to merely enhance performance may also be included in coverage of the present invention.

The image partition module 101 may partition an input image into at least one block. Herein, the input image may have various forms and sizes such as picture, slice, tile, segment, etc. The block may mean a coding unit (CU), a prediction unit (PU), or a transform unit (TU). The partition may be performed on the basis of at least one of a quad tree and a binary tree. The quad tree is a method of partitioning a parent block into four child blocks having a width and a height being half of a width and a height of the parent block. The binary tree is a method of partitioning a parent block into two child blocks having a width or a height being half of a width or a height of the parent block. The block may have a square, as well as, a non-square shape through partition based on the binary tree described above.

The prediction modules 102 and 103 may include an inter-prediction module 103 performing inter-prediction, and an intra-prediction module 102 performing intra-prediction. Whether or not to perform inter-prediction for a prediction unit or whether or not to perform intra-prediction for a prediction unit may be determined, and detailed information according to each prediction (for example, intra-prediction mode, motion vector, reference picture, etc.) may be determined. Herein, a unit for which prediction is performed may differ from a unit in which a prediction method and detailed contents are determined. For example, a prediction method and a prediction mode may be determined in a prediction unit, and prediction may be performed in a transform unit.

A residual value (residual block) between a generated prediction block and an original block may be input to the transform module 105. In addition, prediction mode information, motion vector information, etc. which are used for prediction may be encoded in the entropy encoding module 107 with a residual value, and transferred to the decoder. When a specific encoding mode is used, a prediction block may not be generated by the prediction modules 102 and 103, and an original block may be encoded as it is and transferred to the decoder.

The intra-prediction module 102 may generate a prediction block on the basis of reference pixel information around a current block which is pixel information within a current picture. When a prediction mode of a block around a current block for which intra-prediction will be performed is inter-prediction, a reference pixel included in a neighbouring block to which inter-prediction is applied may be replaced with a reference pixel within another neighbouring block to which intra-prediction is applied. In other words, when a reference pixel is not available, information of a non-available reference pixel may be replaced and used with at least one reference pixel among available reference pixels.

In intra-prediction, a prediction mode may include a directional prediction mode using reference pixel information according to a prediction direction, and a non-directional mode without using directional information when performing prediction. A mode for predicting luma information may differ from a mode for predicting chroma information, and intra-prediction mode information used for predicting luma information or predicted luma signal information may be used for predicting chroma information.

The intra-prediction module 102 may include an adaptive intra smoothing (AIS) filter, a reference pixel interpolation module, and a DC filter. The AIS filter is a filter performing filtering for a reference pixel of a current block, and whether or not to apply a filter may be adaptively determined according to a prediction mode of a current prediction unit. When a prediction mode of a current block is a mode that does not perform AIS filtering, an AIS filter may not be applied.

The reference pixel interpolation module of the intra-prediction module 102 may generate a reference pixel of a fractional position by performing interpolation for a reference pixel when an intra-prediction mode of a prediction unit is a prediction unit performing intra-prediction on the basis of a pixel value obtained by performing interpolation for the reference pixel. When a prediction mode of a current prediction unit is a prediction mode generating a prediction block without performing interpolation for a reference pixel, interpolation for the reference pixel may not be performed. When a prediction mode of a current block is a DC mode, a prediction block may be generated through a DC filter.

The inter-prediction module 103 may generate a prediction block by using a reconstructed reference image, and motion information which are stored in the memory 112. Motion information may include, for example, a motion vector, a reference picture index, a list 1 prediction flag, a list 0 prediction flag, etc.

A residual block including residual information that is a difference value between a prediction unit generated in the prediction modules 102 and 103 and an original block of the prediction unit may be generated. The generated residual block may be transformed by being input to the transform module 105.

The inter-prediction module 103 may derive a prediction block on the basis of information of at least one of a previous picture and an afterwards picture of a current picture. In addition, a prediction block of a current block may be derived on the basis of information of a partial region within a current picture which has been already encoded. The inter-prediction module 103 according to an embodiment of the present invention may include a reference picture interpolation module, a motion estimation module, and a motion compensation module.

The reference picture interpolation module may receive reference picture information from the memory 112, and generate pixel information of an integer pixel or smaller from the reference picture. In case of a luma pixel, in order to generate pixel information of an integer pixel or smaller on a per ¼ pixel basis, a DCT-based 8-tap interpolation filter which uses different filter coefficient may be used. In case of a chroma signal, in order to generate pixel information of an integer pixel or smaller on a per ⅛ pixel basis, a DCT-based 4-tap interpolation filter which uses different filter coefficient may be used.

The motion estimation module may perform motion estimation on the basis of an interpolated reference picture obtained from the reference picture interpolation module. In order to calculate a motion vector, various methods may be used such as FBMA (full search-based block matching algorithm), TSS (three step search), NTS (new three-step search algorithm), etc. A motion vector may have a motion vector value on a per ½ or ¼ pixel basis on the basis of an interpolated pixel. The motion estimation module may predict a prediction block of a current block by using different motion estimation method. As motion estimation methods, various methods may be used such as a skip method, a merge method, an advanced motion vector prediction (AMVP) method, etc.

The subtractor 104 may generate a residual block of a current block by subtracting a prediction block generated in the intra-prediction module 102 or inter-prediction module 103 from a current block to be encoded.

The transform module 105 may perform transform for a residual block including residual data by using transform methods such as DCT, DST, KLT (Karhunen Loeve transform), etc. Herein, a transform method may be determined on the basis of an intra-prediction mode of a prediction unit which is used for generating a residual block. For example, DCT may be used for a horizontal direction and DST may be used for a vertical direction according to an intra-prediction mode.

The quantization module 106 may perform quantization for values transformed into a frequency domain in the transform module 105. A quantization coefficient may vary according to a block or image importance. A value calculated in the quantization module 106 may be provided to the dequantization module 108 and the entropy encoding module 107.

The transform module 105 and/or the quantization module 106 may be selectively included in the image encoding device 100. In other words, the image encoding device 100 may perform at least one of transform and quantization for residual data of a residual block, or may encode a residual block by skipping both of transform and quantization. A block input to the entropy encoding module 107 is typically referred to a transform block even though at least one of transform and quantization is not performed or both of transform and quantization are not performed in the image encoding device 100. The entropy encoding module 107 entropy encodes input data. The entropy encoding module may use, for example, various encoding methods such as exponential Golomb, CAVLC (context-adaptive variable length coding), and CABAC (context-adaptive binary arithmetic coding).

The entropy encoding module 107 may encode various types of information such as coefficient information of a transform block, block type information, prediction mode information, partition unit information, prediction unit information, transmission unit information, motion vector information, reference frame information, interpolation information of a block, filtering information, etc. Coefficients of a transform block may be encoded in units of sub-block within a transform block.

In order to encode a coefficient of a transform block, various syntax elements may be encoded such as Last_sig that is a syntax element indicating a position of the first non-zero coefficient in an inverse scan order, Coded_sub_blk_flag that is a flag representing whether or not at least one non-zero coefficient is present within a sub-block, Sig_coeff_flag that is a flag representing whether or not a coefficient is non-zero, Abs_greater1_flag that is a flag representing whether or not an absolute value of a coefficient is greater than 1, Abs_greater2_flag that is a flag representing whether or not an absolute value of a coefficient is greater than 2, Sign_flag that is a flag representing a sign of a coefficient, etc. A residual value of a coefficient which is not encoded through the above syntax elements may be encoded through a syntax element of remaining_coeff.

The dequantization module 108 and the inverse transform module 109 perform dequantization for values quantized in the quantization module 106, and perform inverse transform for values transformed in the transform module 105, respectively. A residual value generated in the dequantization module 108 and the inverse transform module 109 may be added to a prediction unit predicted through a motion estimation module, a motion compensation module, and the intra-prediction module 102 which are included in the prediction modules 102 and 103 so as to generate a reconstructed block. The adder 110 may generate a reconstructed block by adding a prediction block generated in the prediction modules 102 and 103, and a residual block generated through the inverse transform module 109.

The filter module 111 may include at least one of a deblocking filter, an offset correction module, and an ALF (Adaptive Loop Filter).

The deblocking filter may remove block distortion occurring due to boundaries between blocks in a reconstructed picture. In order to determine whether or not to perform deblocking, whether or not to apply a deblocking filter may be determined on the basis of pixels included in some rows and columns included in a block. When applying a deblocking filter to a block, a strong filter or a weak filter may be applied according to required deblocking filtering strength. In addition, when applying a deblocking filter, horizontal filtering and vertical filtering may be processed in parallel when performing horizontal filtering and vertical filtering.

The offset correction module may correct an offset with an original image on a per pixel basis for which deblocking is performed. In order to perform offset correction for a specific picture, there may be used a method of dividing pixels included in an image into a predetermined number of regions, determining regions for which offset correction is performed, and applying an offset to the corresponding region, or a method of applying an offset by taking into account edge information of each pixel.

The ALF (adaptive loop filtering) may be performed on the basis of a value obtained by comparing a reconstructed image for which filtering is performed with an original image. After dividing pixels included in an image into a predetermined number of groups and determining one filter to be applied to the corresponding group, different filtering may be performed for each group. Information related to whether or not to apply an ALF may be transmitted in a coding unit (CU) for a luma signal, and an ALF filter shape and a filter coefficient to be applied according to each block may vary. In addition, an ALF filter of the same type (fixed shape) may be applied regardless of a feature of a block to which the filter will be applied.

The memory 112 may store a reconstructed block or picture calculated through the filter module 111, and provide the stored reconstructed block or picture to the prediction modules 102 and 103 when performing inter-prediction.

Figure 2:
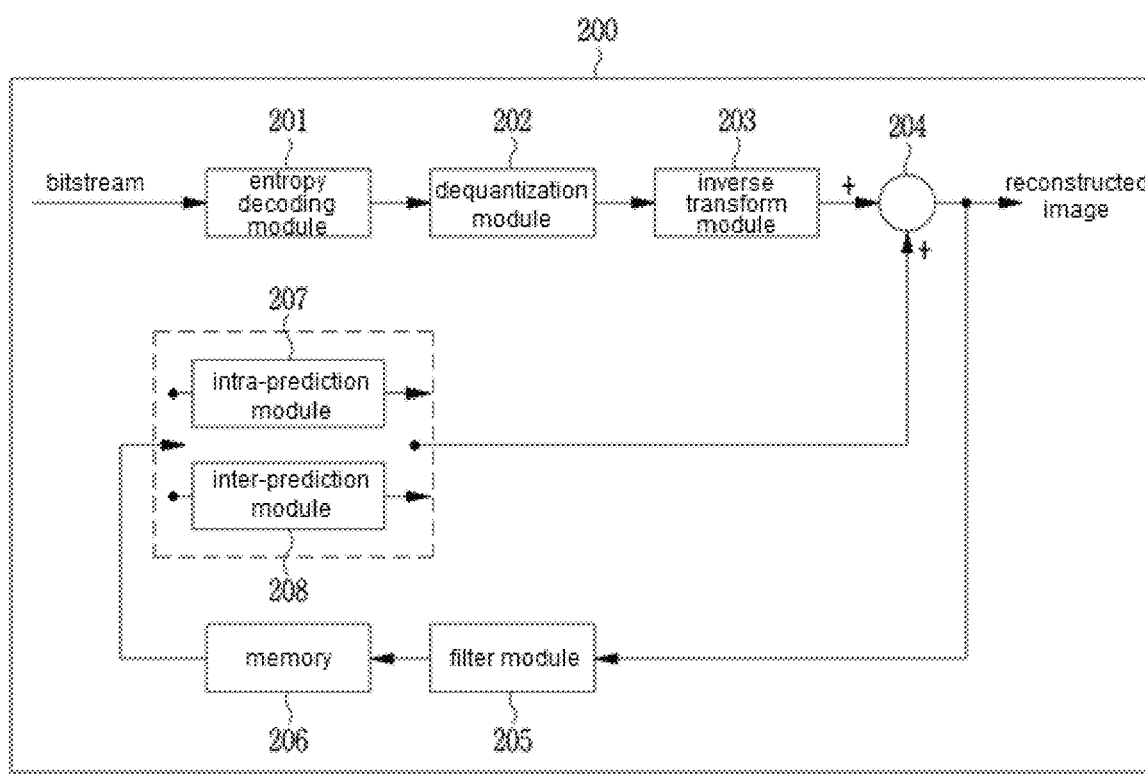
FIG. 2 is a block diagram showing an image decoding device according to an embodiment of the present invention.

Subsequently, an image decoding device according to an embodiment of the present invention will be described with reference to the figure. FIG. 2 is a block diagram showing an image decoding device 200 according to an embodiment of the present invention.

Referring to FIG. 2, the image decoding device 200 may include an entropy decoding module 201, a dequantization module 202, an inverse transform module 203, an adder 204, a filter module 205, a memory 206, and prediction modules 207 and 208.

When an image bitstream generated by the image encoding device 100 is input to the image decoding device 200, the input bitstream may be decoded according to the reverse procedure to that performed by the image encoding device 100.

The entropy decoding module 201 may perform entropy decoding according to the reverse procedure to that performed by the entropy encoding module 107 of the image encoding device 100. For example, in association with a method performed in the image encoder, various methods may be applied, such as exponential Golomb, CAVLC (context-adaptive variable length coding), and CABAC (context-adaptive binary arithmetic coding). The entropy decoding module 201 may decode syntax elements described above, that is, Last_sig, Coded_sub_blk_flag, Sig_coeff_flag, Abs_greater1_flag, Abs_greater2_flag, Sign_flag, and remaining_coeff. In addition, the entropy decoding module 201 may decode information related to intra-prediction and inter-prediction which are performed in the image encoding device 100.

The dequantization module 202 may generate a transform block by performing dequantization for a quantized transform block. The dequantization module 202 operates substantially identically to the dequantization module 108 of FIG. 1.

The inverse transform module 203 may generate a residual block by performing inverse transform for a transform block. Herein, the transform method may be determined on the basis of information related to a prediction method (inter or intra-prediction), a size and/or shape of a block, an intra-prediction mode, etc. The inverse transform module 203 operates substantially identically to the inverse transform module 109 of FIG. 1.

The adder 204 may generate a reconstructed block by adding a prediction block generated in an intra-prediction module 207 or inter-prediction module 208, and a residual block generated through the inverse transform module 203. The adder 204 operates substantially identically to the adder 110 of FIG. 1.

The filter module 205 reduces various types of noises occurring in the reconstructed blocks.

The filter module 205 may include a deblocking filter, an offset correction module, and ALF.

Information related to whether or not a deblocking filter is applied to a corresponding block or picture and information related to whether a strong filter or a weak filter is applied when the deblocking filter is applied may be provided from the image encoding device 100. The deblocking filter of the image decoding device 200 may be provided with information related to a deblocking filter provided from the image encoding device 100, and deblocking filtering for a corresponding block may be performed in the image decoding device 200.

The offset correction module may perform offset correct for a reconstructed image on the basis of information of an offset correction type applied to an image when encoding, and an offset value, etc.

The ALF may be applied to a coding unit on the basis of information of whether or not to apply an ALF, information of an ALF coefficient, etc. which are provided from the image encoding device 100. The above ALF information may be provided by being included in a specific parameter set. The filter module 205 operates substantially identically to the filter module 111 of FIG. 1.

The memory 206 stores a reconstructed block generated by the adder 204. The memory 206 operates substantially identically to the memory 112 of FIG. 1.

The prediction modules 207 and 208 may generate a prediction block on the basis of information related to generating a prediction block which is provided from the entropy decoding module 201, and information of a previously decoded block or picture which is provided from the memory 206.

The prediction modules 207 and 208 may include the intra-prediction module 207 and the inter-prediction module 208. Although it is not shown separately, the prediction modules 207 and 208 may further include a prediction unit determining module. The prediction unit determining module may receive various types of information such as prediction unit information, prediction mode information of an intra-prediction method, information related to motion estimation of the inter-prediction method, etc., which are input from the entropy decoding module 201; determine a prediction unit in a current coding unit; and determine whether or not a prediction unit performs inter-prediction or intra-prediction. The inter-prediction module 208 may perform inter-prediction for a current prediction unit on the basis of information included in at least one of a previous picture and an afterwards picture of a current picture in which the current prediction unit is included by using information required for inter-prediction of the current prediction unit which is provided from the image encoding device 100. In addition, inter-prediction may be performed on the basis of information of a partial reconstructed region within a current picture in which the current prediction unit is included.

In order to perform inter-prediction, there may be determined based on a coding unit which mode to use as a motion estimation method of a prediction unit included in a corresponding coding unit among a skip mode, a merge mode, and an AMVP mode.

The intra-prediction module 207 generates a prediction block by using reconstructed pixels positioned around a current block to be encoded.

The intra-prediction module 207 may include an AIS (adaptive intra smoothing) filter, a reference pixel interpolation module, and a DC filter. The AIS filter is a filter performing filtering for a reference pixel of a current block, and whether or not to apply a filter may be adaptively determined according to a prediction mode of a current prediction unit. AIS filtering may be performed for a reference pixel of a current block by using a prediction mode of a prediction unit and AIS filter information which are provided from the image encoding device 100. When a prediction mode of a current block is a mode that does not perform AIS filtering, an AIS filter may not be applied.

The reference pixel interpolation module of the intra-prediction module 207 may generate a reference pixel of a fractional position by performing interpolation for a reference pixel when a prediction mode of a prediction unit is a prediction unit performing intra-prediction on the basis of a pixel value obtained by performing interpolation for the reference pixel. The generated reference pixel of a fractional position may be used as a prediction pixel of a pixel within current block. When a prediction mode of a current prediction unit is a prediction mode generating a prediction block without performing interpolation for a reference pixel, interpolation for the reference pixel may not be performed. When a prediction mode of a current block is a DC mode, a prediction block may be generated through a DC filter.

The intra-prediction module 207 operates substantially identically to the prediction module 102 of FIG. 1.

The inter-prediction module 208 generates an inter-prediction block by using a reference picture, and motion information which are stored in the memory 206. The inter-prediction module 208 operates substantially identically to the inter-prediction module 103 of FIG. 1.

Various embodiments of the present invention will now be described in more detail with reference to the drawings.

First Embodiment

Figure 3:
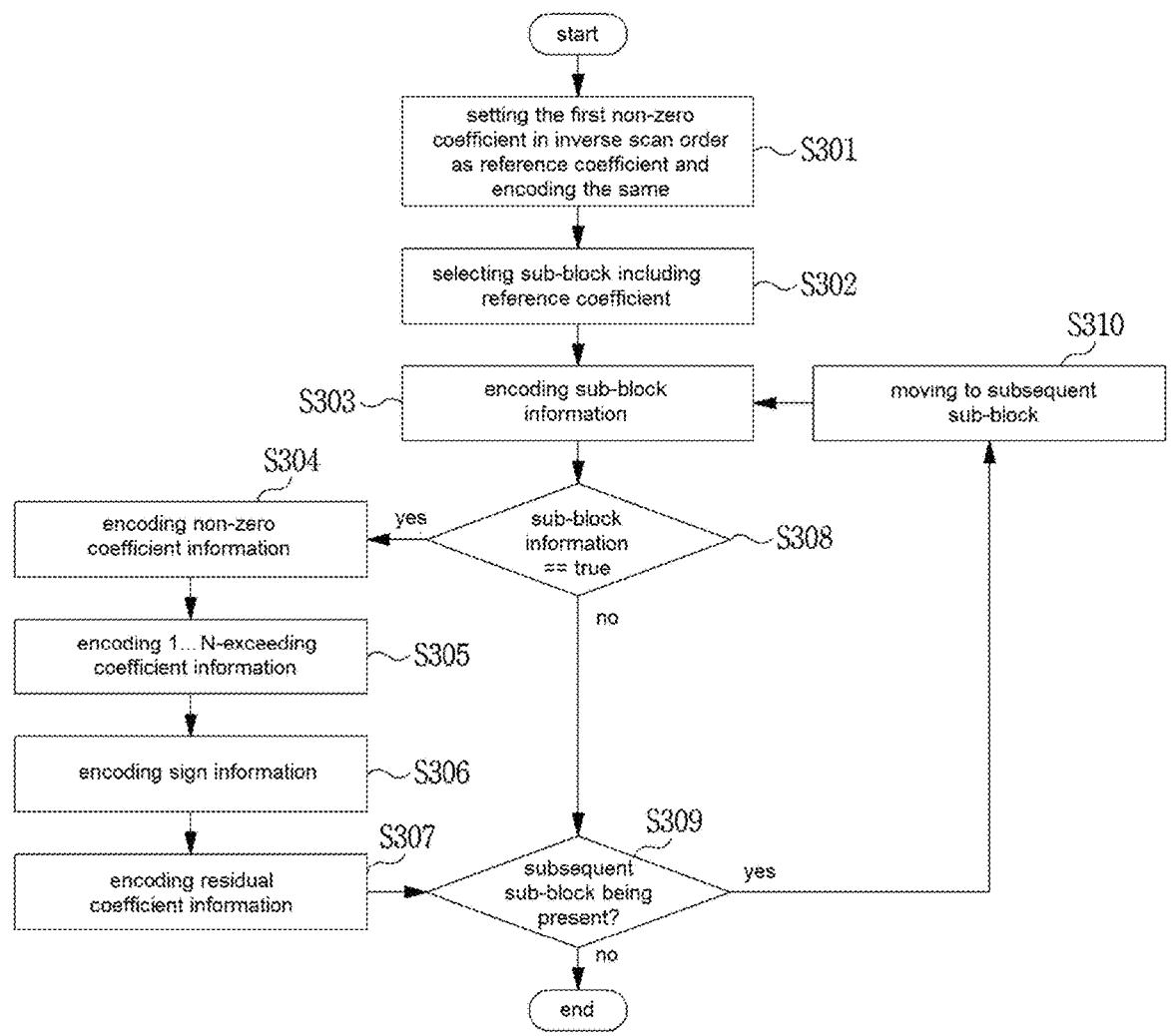
FIG. 3 is a view of a flowchart showing a method of encoding a transform block according to an embodiment of the present invention.

FIG. 3 is a view of a flowchart showing a method of encoding a transform block according to an embodiment of the present invention. A method of encoding a transform block of FIG. 3 may be performed by the entropy encoding module 107 of the image encoding device 100.

Figure 4A:
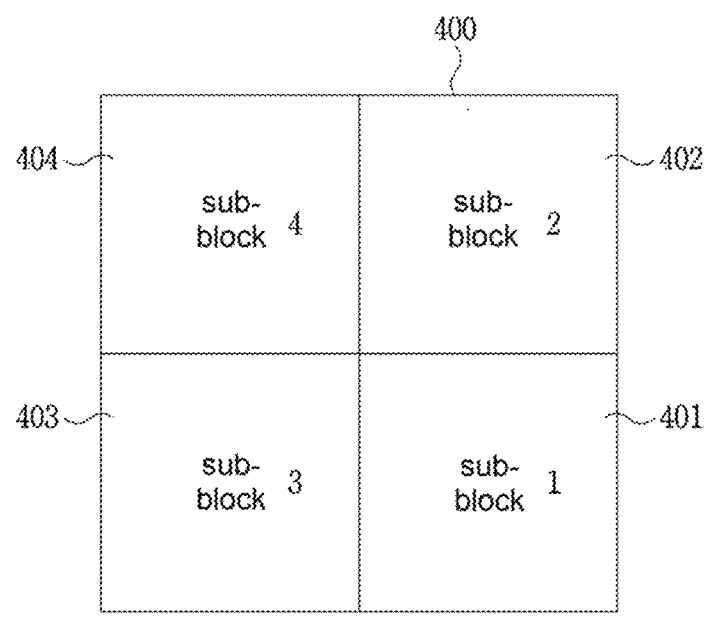
FIGS. 4*a* to 4*d* are views showing examples of diagonal inverse scanning, vertical inverse scanning, and horizontal inverse scanning in units of sub-block.

As shown in FIG. 4a, one transform block may be encoded in units of sub-blocks. Referring to FIG. 4a, when a current transform block 400 to be encoded or decoded is an 8×8 block, the current transform block 400 may be partitioned into four sub-blocks 401 to 404 of sub-block 1 to sub-block 4 having a 4×4 size. As a scan method for determining an encoding order of transform coefficients within a transform block, there may be used a vertical, horizontal or diagonal inverse scan method according to a prediction mode of a current block or current transform block. Herein, the prediction mode may be inter-prediction or intra-prediction.

Figure 4B:
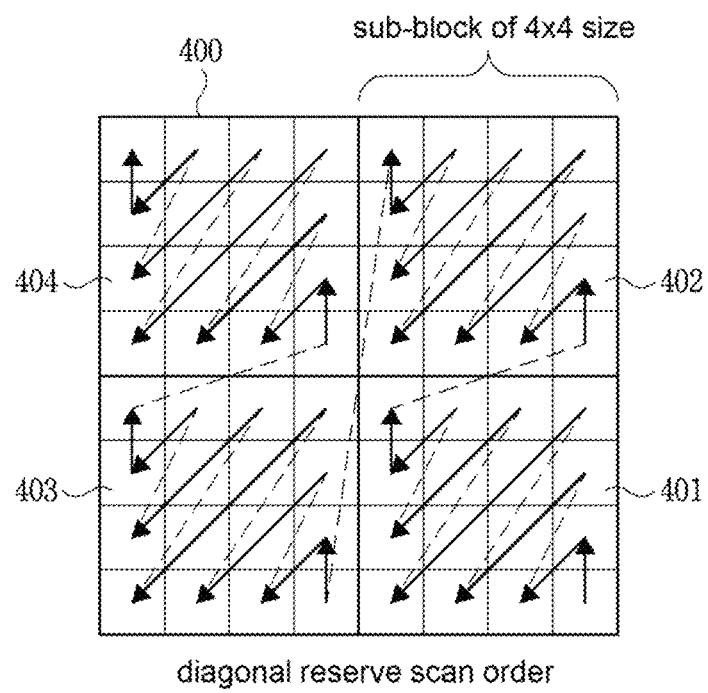
Figure 4C:
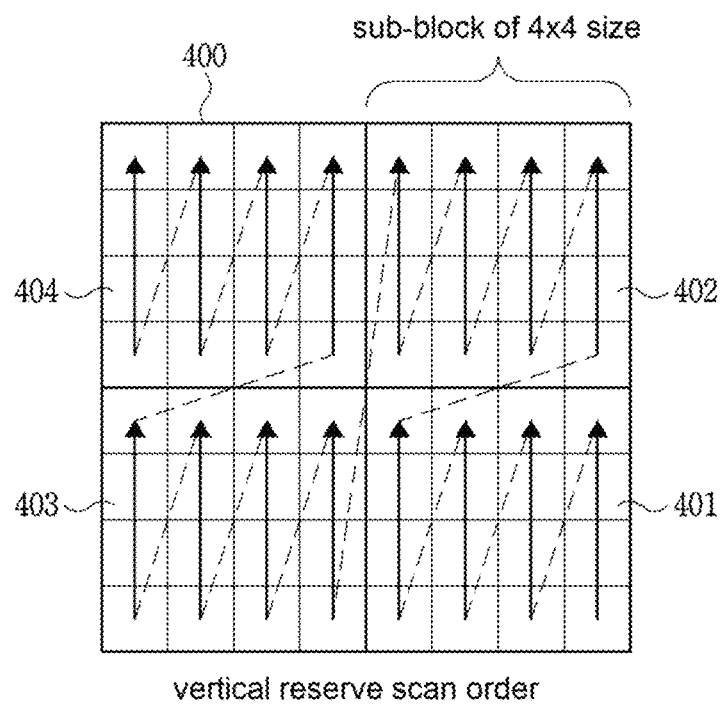
Figure 4D:
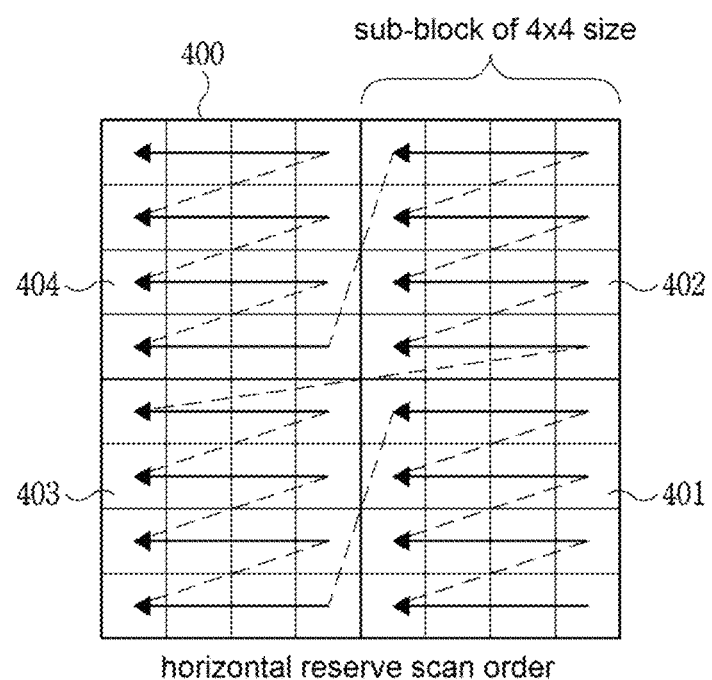

FIGS. 4b, 4c, and 4d represent diagonal inverse scanning, vertical inverse scanning, and horizontal inverse scanning, respectively. Herein, for convenience of description, an example of a diagonal inverse scan is described, but vertical inverse scanning or horizontal inverse scanning may be applied.

Referring to FIG. 3, in S301, first, the first non-zero coefficient when scanning transform coefficients according to an inverse scan order is determined as a reference coefficient, and Last_sig of positional information thereof is encoded.

In S302, a sub-block where the reference coefficient is included is selected, and in S303, information of the corresponding sub-block is encoded. Coded_sub_blk_flag that is sub-block information is a flag representing whether or not at least one non-zero coefficient is present within a current sub-block. Subsequently, in S304, information of the non-zero coefficient is encoded. Herein, Sig_coeff_flag that is non-zero coefficient information represents whether or not a value of each coefficient present within a sub-block is 0.

Subsequently, in S305, N-exceeding coefficient information is encoded. Herein, the N-exceeding coefficient information represents whether or not an absolute value of each coefficient, for all coefficients present in a sub-block, respectively exceeds from 1 to N. An arbitrary value preset when performing encoding and decoding is used as N, and a value of N may be encoded such that the same value is used when performing encoding and decoding. For a number of pieces of N-exceeding coefficient information, an arbitrary preset value may be used, or different numbers may be used according to a reference coefficient position. For example, when N is set to 3, for all coefficients determined to be non-zero in the sub-block, whether or not an absolute value of each coefficient is greater than 1 is encoded. For the same, Abs_greater1_flag that is a flag representing whether or not an absolute value of a coefficient is greater than 1 is used. Subsequently, for a coefficient that is determined to be greater than 1, whether or not being greater than 2 is encoded. For the same, Abs_greater2_flag that is a flag representing whether or not an absolute value of a coefficient is greater than 2 is used. Finally, for a coefficient that is determined to be greater than 2, whether or not being greater than 3 is encoded. For the same, Abs_greater3_flag that is a flag representing whether or not an absolute value of a coefficient is greater than 3 may be used.

Subsequently, in S306, for each coefficient determined to be non-zero, sign information representing whether being a negative number of a positive number is encoded. Sign_flag may be used as sign information. Subsequently, in S307, for a coefficient determined to be greater than N, a remaining value except for N is defined as residual coefficient information, and remaining_coeff that is residual coefficient information of the corresponding coefficient is encoded.

Subsequently, in S309, whether or not a subsequent sub-block is present is determined, and if so, in S310, moving to the subsequent sub-block is performed, and in S303, encoding of sub-block information is performed. In S308, Coded_sub_blk_flag of the corresponding sub-block information is determined, and when a value of Coded_sub_blk_flag is determined to be true, Sig_coeff_flag that is non-zero coefficient information is encoded. When a value of Coded_sub_blk_flag of the corresponding sub-block information is false, it means that a coefficient to be encoded is not present in the corresponding sub-block, and thus whether or not a subsequent sub-block is present is determined. Alternatively, moving to a subsequent sub-block is performed when the corresponding sub-block is a sub-block positioned at the lowest frequency section. Assuming that a non-zero coefficient is present, it may be set to a true value when performing encoding and decoding without performing encoding and decoding of information of a sub-block.

Figure 5:
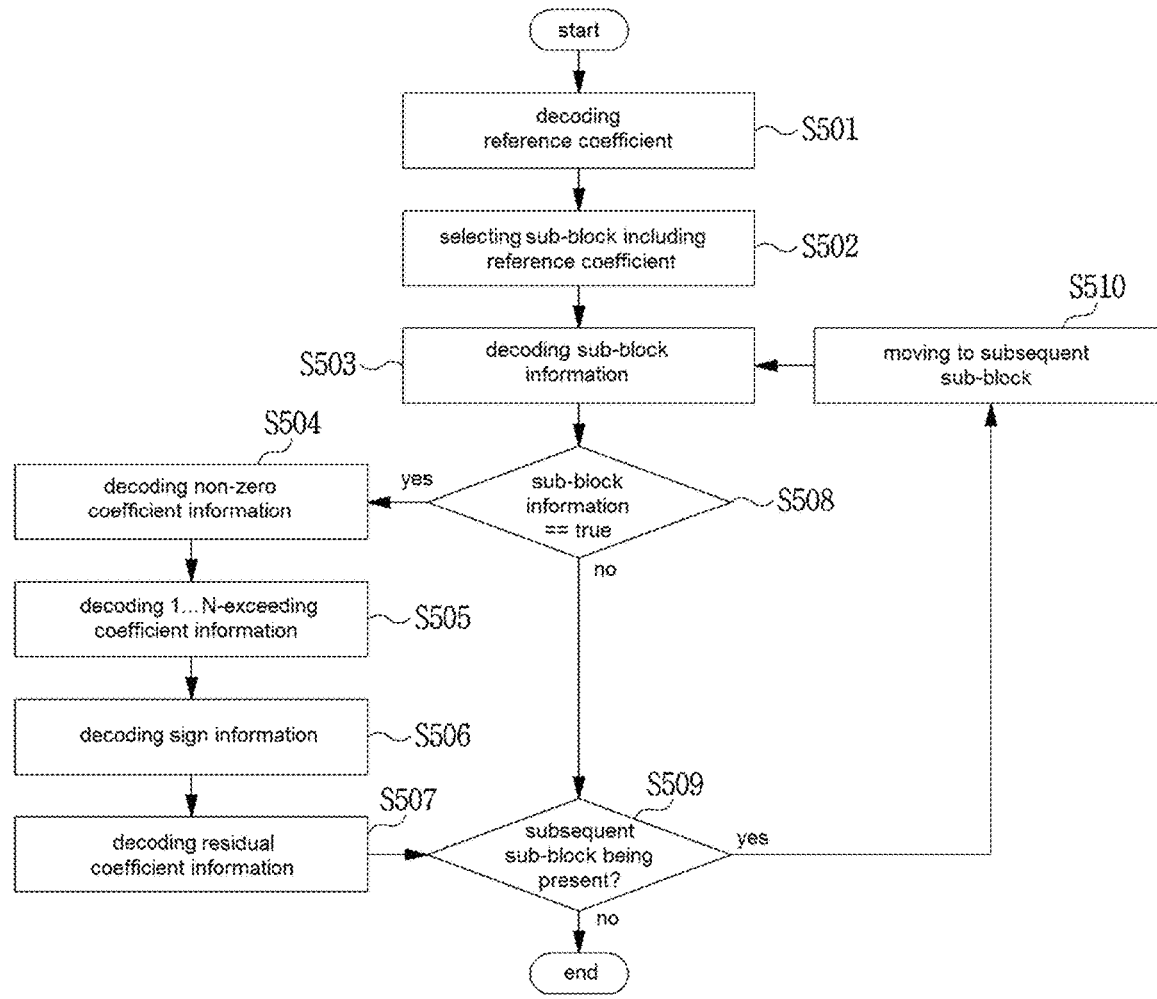
FIG. 5 is a view of a flowchart showing a method of decoding a transform block according to an embodiment of the present invention.

FIG. 5 is a view of a flowchart showing a method of decoding a transform block according to an embodiment of the present invention. A method of decoding a transform block of FIG. 5 is in association with a method of encoding a transform block of FIG. 3. The method of decoding a transform block of FIG. 5 may be performed by the entropy decoding module 201 of the image decoding device 200.

In S501, Last_sig that is positional information of a reference coefficient being the first non-zero transform coefficient according to an inverse scan order is decoded.

In S502, a sub-block where the reference coefficient is included is selected, and in S503, Coded_sub_blk_flag that is sub-block information is decoded. Subsequently, in S504, Sig_coeff_flag that is non-zero coefficient information is decoded. Subsequently, in S505, N-exceeding coefficient information is decoded. Herein, the N-exceeding coefficient information may include Abs_greater1_flag, Abs_greater2_flag, and Abs_greater3_flag, etc., which are described above.

Subsequently, in S506, Sign_flag that is sign information of each coefficient determined to be non-zero is decoded. Subsequently, in S507, for a coefficient determined to be greater than N, remaing_coeff that is residual coefficient information corresponding to a remaining value except N is decoded. Subsequently, in S509, whether or not a subsequent sub-block is present is determined, if so, in S510, moving to the subsequent sub-block is performed, and in S503, Coded_sub_blk_flag of sub-block information is decoded. In S508, Coded_sub_blk_flag of the corresponding sub-block information is determined, when it is determined to be true, Sig_coeff_flag that is non-zero coefficient information is decoded, and when it is determined to be false, it means that a coefficient to be decoded is not present in the corresponding sub-block, and thus whether or not a subsequent sub-block is present is determined.

Figure 6:
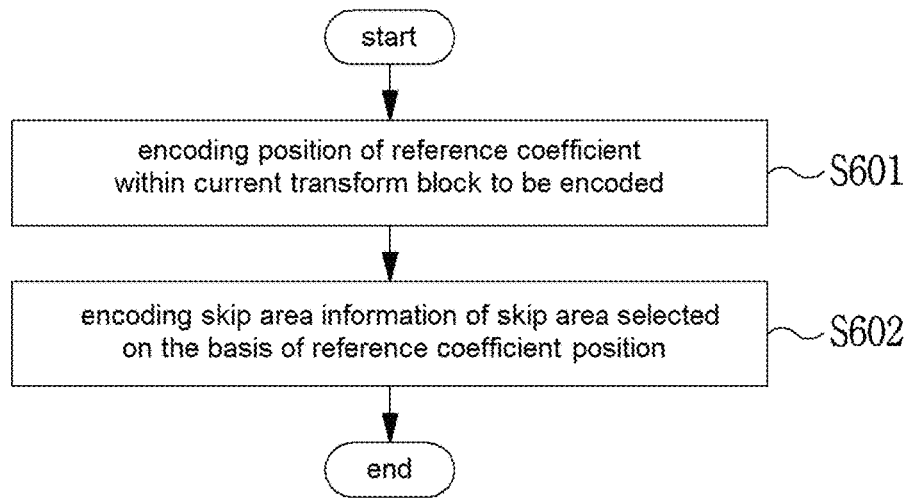
FIG. 6 is a view of a flowchart showing an image encoding method using a skip region according to an embodiment of the present invention.

FIG. 6 is a view of a flowchart showing an image encoding method using a skip region according to an embodiment of the present invention. The image encoding method of FIG. 6 may be performed by the entropy encoding module 107 of the image encoding device 100.

Referring to FIG. 6, in S601, first, the entropy encoding module 107 encodes a position of a reference coefficient within a current transform block to be encoded. As described above, the reference coefficient means the first non-zero coefficient when performing scanning for coefficients in an inverse scan order. Subsequently, in S602, skip region information of a skip region selected on the basis of the position of the reference coefficient is encoded.

Herein, the skip region is a region within the current transform block that may be determined on the basis of the position of the reference coefficient. The skip region information represents whether or not all coefficients within the skip region have the same value. Herein, the same value of the coefficients within the skip region may be 0. When the same value of the coefficients within the skip region is not 0, information representing a value other than 0 may be additionally encoded. An arbitrary preset value other than 0 may be used as the same value of the coefficients within the skip region. Herein, information of the preset value may be encoded through a parent header rather than in units of transform blocks.

Meanwhile, the skip region may be identically determined according to a preset rule when performing encoding/decoding, or the same position may be used in the encoding device 100 or decoding device 200 by additionally encoding coordinates indicating a range of the skip region within the transform block.

Figure 7:
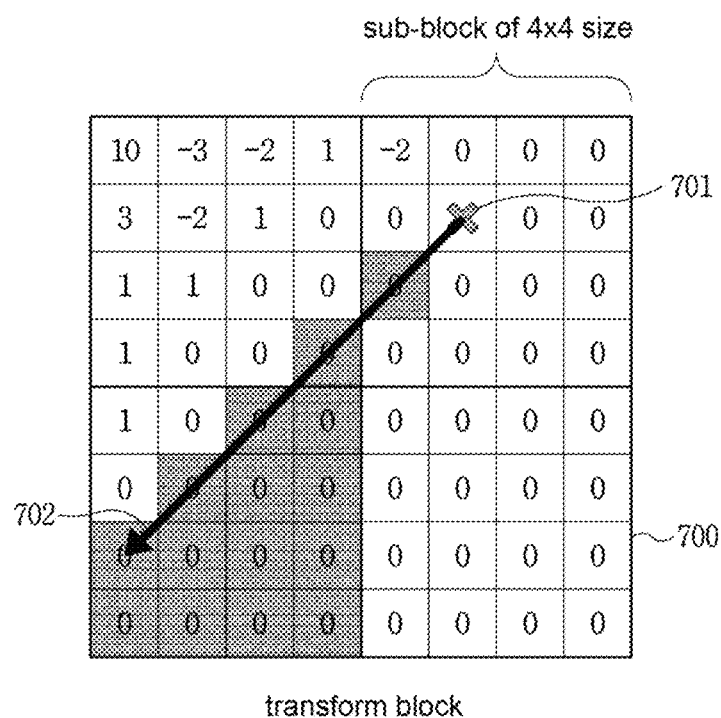
FIG. 7 is a view showing a skip region according to an embodiment of the present invention.

FIG. 7 is a view showing a skip region according to an embodiment of the present invention. It is assumed that diagonal inverse scanning is used when encoding coefficients of a current transform block 700.

Referring to FIG. 7, after generating a reference line 702 in a direction to a lower left 45 degree on the basis of a reference coefficient 701, as a skip region, a region is designated including coefficients present on the reference line 702 and coefficients present below the reference line 702. In FIG. 7, the skip region is indicated by shading, and all coefficients in the skip region have the same value of 0. In addition, all coefficients within the skip region are positioned behind the reference coefficient in an encoding order.

As another example of setting the skip region, when coefficients present within the skip region are few as the reference coefficient is positioned at an arbitrary region within the transform block, the skip region is not defined on the basis of the reference coefficient. The skip region may be set by using one non-zero coefficient present after the reference coefficient in an inverse scan order, or by using a coefficient adjacent to the reference coefficient. Herein, the arbitrary region within the transform block where the reference coefficient is positioned may be set by comparing a number of sub-blocks calculated in the inverse scan order with a preset threshold value. Alternatively, the arbitrary region may be set by comparing with a preset threshold value by determining how far the reference coefficient is away from an arbitrary position of the transform block. For example, the arbitrary position may be a center point that is a middle point between a width and a height of the transform block. Alternatively, after dividing a width and a height of the transform block into m and n, respectively, the arbitrary region may be set to an arbitrary one among regions obtained by dividing the transform block. Herein, a value of m and n may be encoded in units of block or through a parent header, or the same preset value may be used which is identically set when performing encoding and decoding.

Figure 8:
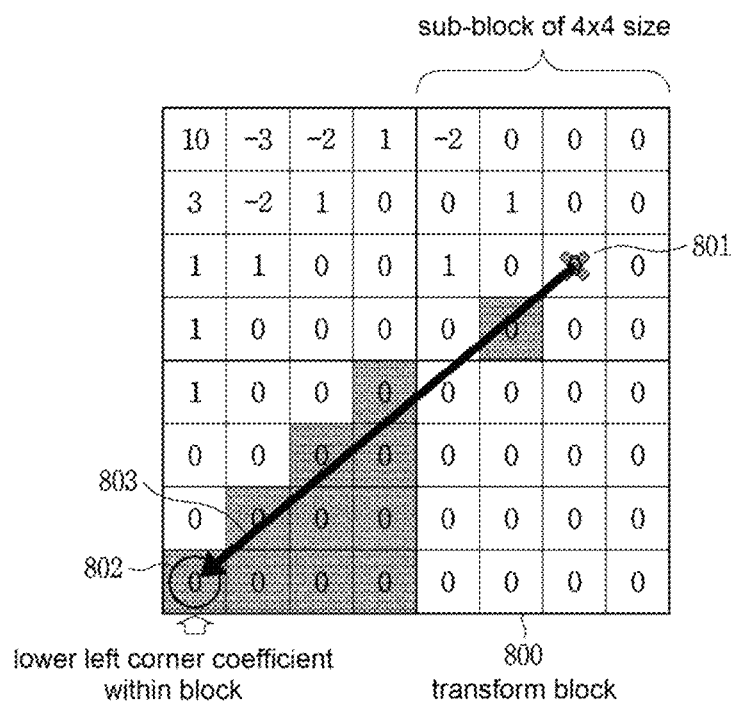
FIG. 8 is a view showing a skip region according to another embodiment of the present invention.

FIG. 8 is a view showing a skip region according to another embodiment of the present invention. After generating a reference line 803 from a reference coefficient 801 within a transform block 800 to a coefficient 802 present at a lower left corner within the transform block 800, a region including coefficients positioned on the reference line 803 and coefficients present below the reference line 803 is designated as a skip region. Herein, coefficients belonging to the skip region are positioned behind the reference coefficient in an encoding order. In FIG. 8, the skip region is shaded.

Meanwhile, although it is not shown in FIG. 6, a skip region other than the skip region set in S601 and S603 may be additionally set. The additionally set skip region may be encoded by using additional skip region information.

Figure 9:
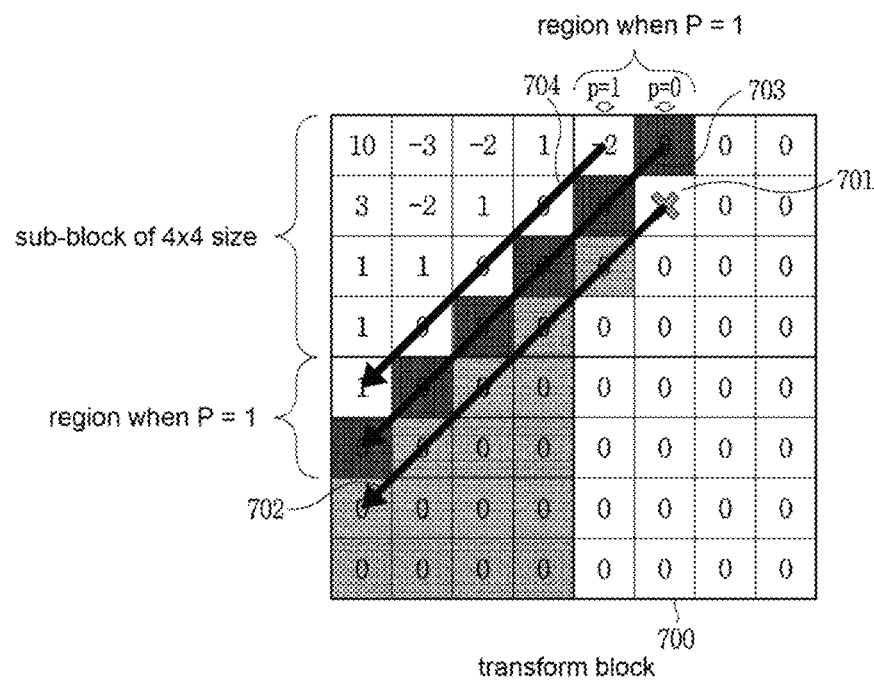
FIG. 9 is a view showing an additional skip region according to an embodiment of the present invention.

FIG. 9 is a view showing an additional skip region according to an embodiment of the present invention. An additional skip region is set in FIG. 9 in addition to the skip region shown in FIG. 7. An upper region of the skip region of FIG. 7 is set as the additional skip region, and additional skip region information may be encoded which represents whether or not all coefficients within the additional skip region have the same value. Herein, the same value of the coefficients within the skip region may be 0. When the same value of the coefficients within the skip region is not 0, information representing a value other than 0 may be additionally encoded. As the same value of the coefficients within the skip region, an arbitrary preset value other than 0 may be used. Herein, information of the preset value may be encoded through a parent header rather than in units of transform block.

Meanwhile, a position of the additional skip region may be identically determined according to a preset rule when performing encoding and decoding, or the same position may be used in the encoding device 100 and the decoding device 200 by additionally encoding coordinates within the transform block. Herein, the newly generated additional skip region may be spaced apart from the previous skip region by a distance of p.

Referring to FIG. 9, an example is shown where a skip region is set by generating a reference line 702 on the basis of a reference coefficient 701, and an additional skip region is additionally set in an upper part of the reference line 702. When a distance of p between the additional skip region and the skip region is 0, a region including coefficients on a reference line 703 may be the additional skip region. When a distance of p is 1, the additional skip region includes a region including coefficients on the reference line 703 and a region including coefficients on a reference line 704.

In the present embodiment, an example is used where a distance of p between the additional skip region and the skip region is 0 or 1, but other values may be used. Herein, as p, the same value preset when performing encoding/decoding may be used. Alternatively, a value of p may be encoded in units of block or through a parent header.

In addition, an additional skip region may be added according to a preset method. For example, an additional skip region may be continuously added until additional skip region information becomes false, or encoding for a preset number of times, that is, q times, may be available. Herein, p values different from each other may be set for each added skip region.

Figure 10:
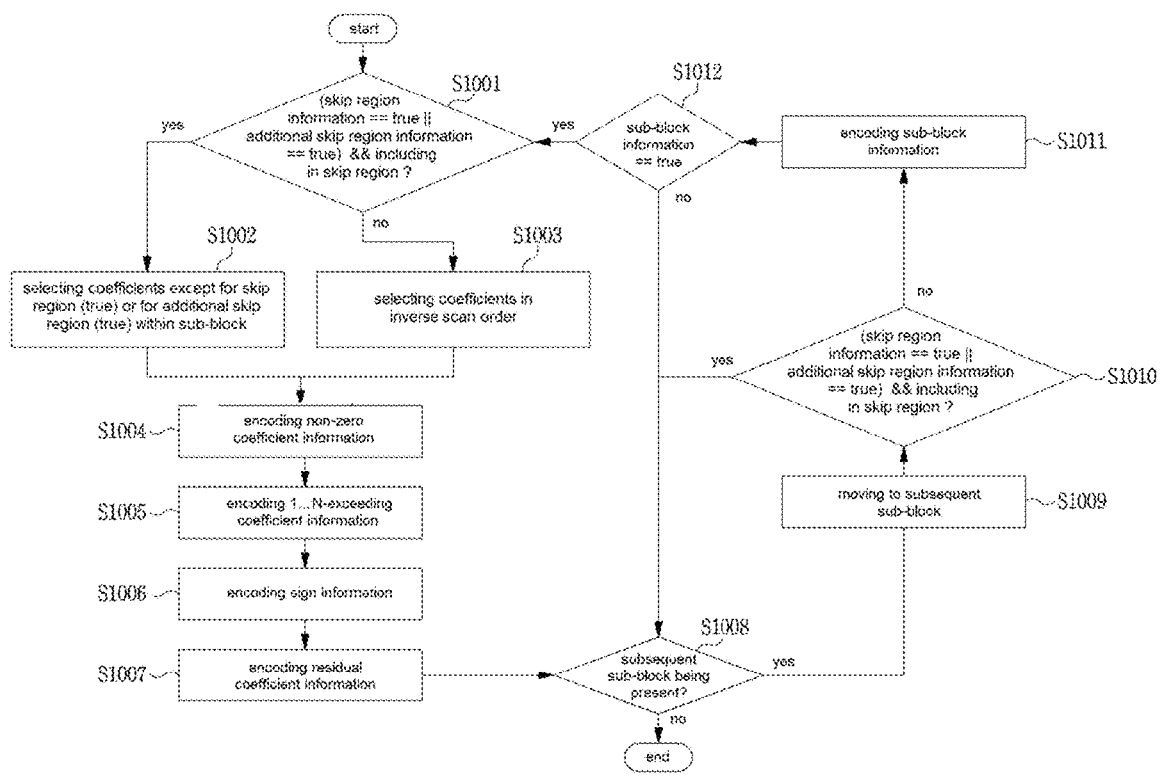
FIG. 10 is a view of a flowchart showing a method of encoding a transform block including a skip region or additional skip region according to an embodiment of the present invention.

FIG. 10 is a view of a flowchart showing a method of encoding a transform block including a skip region or additional skip region according to an embodiment of the present invention. A method shown in FIG. 10 may be performed after a method shown in FIG. 6. The encoding method of FIG. 10 may be performed by the entropy encoding module 107 of the image encoding device 100.

When a reference coefficient is included in a sub-block within a current transform block to be encoded, it means that a coefficient to be encoded is included, and thus Coded_sub_blk_flag that is sub-block information is not encoded. In S1001, whether or not skip region information or additional skip region information is true, and at the same time, whether or not a sub-block to be encoded includes a skip region or additional skip region are determined. In S1002, when both of the above results are true, coefficients positioned in a current sub-block and positioned outside of the skip region in an encoding order are selected. Otherwise, in S1003, coefficients to be encoded are all selected regardless of the skip region. Subsequently, encoding is performed in an order of S1004 of encoding information of a non-zero coefficient, S1005 of encoding N-exceeding coefficient information, S1006 of encoding sign information, and S1007 of encoding residual coefficient information.

Subsequently, in S1008, when a subsequent sub-block is present, in S1009, moving to the subsequent sub-block is performed. In S1010, whether or not skip region information or additional skip region information is true, and at the same time, whether or not a current sub-block to be encoded includes a skip region or additional skip region are determined. As information of the corresponding sub-block has been already encoded as skip region information, moving to the subsequent sub-block is performed. Herein, the above case is available when a value of coefficients within the skip region is 0. When a value of coefficients within the skip region is not 0, the corresponding sub-block information has to be encoded.

When the sub-block does not include the skip region or additional skip region, or skip region information is false, in S1011, sub-block information is encoded, and when the sub-block information is true in S1012, moving to S1001 is performed, otherwise, moving to S1008 is performed. After moving to S1008, when it is determined that a subsequent sub-block is not present, an algorithm of FIG. 10 is ended.

Hereinafter, algorithms shown in FIGS. 6 and 10 will be additionally described by using an example of FIG. 7. Assuming that a scan method of a current transform block is a diagonal inverse scan order, the first non-zero coefficient is set as a reference coefficient. Coefficients present in a low left direction and coefficients below thereof based on the reference coefficient are set as a skip region, and a value of the skip region is determined. As all coefficients of the skip region have the same value of 0, skip region information is encoded to be true. After performing partition in units of sub-blocks, a sub-block including the reference coefficient is encoded first.

Description is made by using an example where a current transform block has a size of 8×8 and a sub-block has a size of 4×4. Skip region information of the first sub-block to be encoded is true and a coefficient to be encoded is present in the corresponding sub-block. Coefficients outside of the skip region are encoded, and thus in an example shown in FIG. 7, the reference coefficient and 1, 0, 0, and −2 which are present above the reference coefficient are encoded. Herein, non-zero coefficient information becomes true, false, false, and true, respectively. Assuming that N is 2, for a coefficient determined to be non-zero, 1-exceeding information is encoded. Coefficient values of 1 and −2 are set to have 1-exceeding information of false and true, respectively. 2-exceeding information is encoded when 1-exceeding information is true, and 2-exceeding information of a coefficient value of −2 is encoded to be false. Subsequently, signs of coefficient values of 1 and −2 which are + and − are respectively encoded. Subsequently, moving to a subsequent sub-block is performed as a subsequent sub-block is present.

For the second sub-block to be encoded, skip region information is true, and a coefficient to be encoded is present in the corresponding sub-block, and thus sub-block information becomes true. Accordingly, 0, 0 and 1 which are coefficients of outside of the skip region are encoded. Non-zero coefficient information of coefficients of 0, 0 and 1 are encoded to be false, false, and true, respectively, and then 1-exceeding information of a coefficient of 1 is encoded to be false. Sign information of the coefficient of 1 is encoded to be +, and moving to a sub-sequent sub-block is performed.

For the third sub-block to be encoded, skip region information is true and a coefficient to be encoded is present in the corresponding sub-block, and thus sub-block information becomes true. When sorting for coefficients outside of the skip region is performed through inverse scanning, the result becomes 0, 0, 0, 0, 0, 1, 1, 1, 1, −2, −2, 1, −3, 3, and 10. The above coefficients are encoded by using S1004 to S1007.

Figure 11:
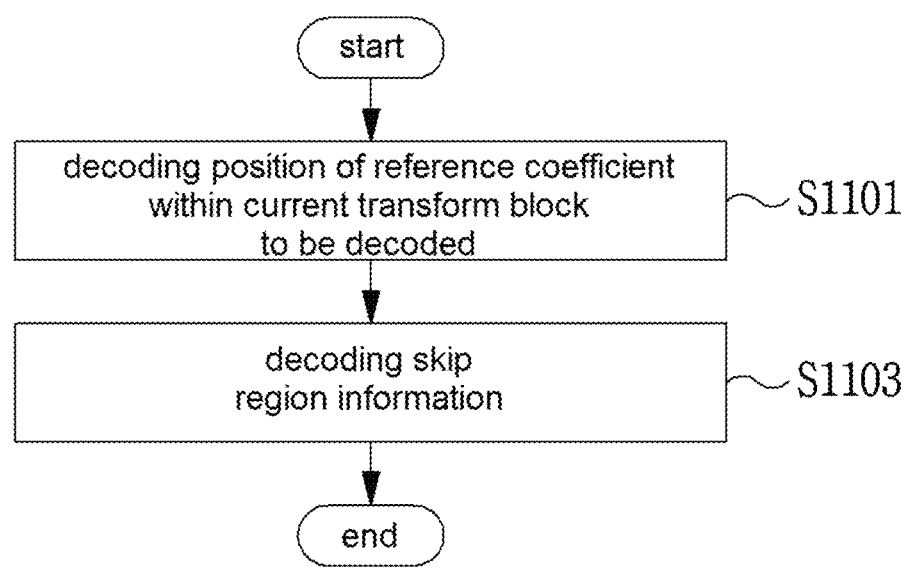
FIG. 11 is a view of a flowchart showing an image decoding method using a skip region according to an embodiment of the present invention.

FIG. 11 is a view of a flowchart showing an image decoding method using a skip region according to an embodiment of the present invention. The decoding method of FIG. 11 may be performed by the entropy decoding module 201 of the image decoding device 200.

Referring to FIG. 11, in S1101, first, the entropy decoding module 201 decodes a position of a reference coefficient within a current transform block to be decoded. Subsequently, in S1103, skip region information of a skip region selected on the basis of the position of the reference coefficient is decoded. As described above, the position of the reference coefficient may be derived by decoding Last_sig. As the skip region and skip region information are the same as those described above, detailed description thereof will be omitted. In addition, although it is not shown in FIG. 11 separately, when an additional skip region that is additionally set in addition to the skip region is present, the additional skip region may be decoded by using additional skip region information.

Figure 12:
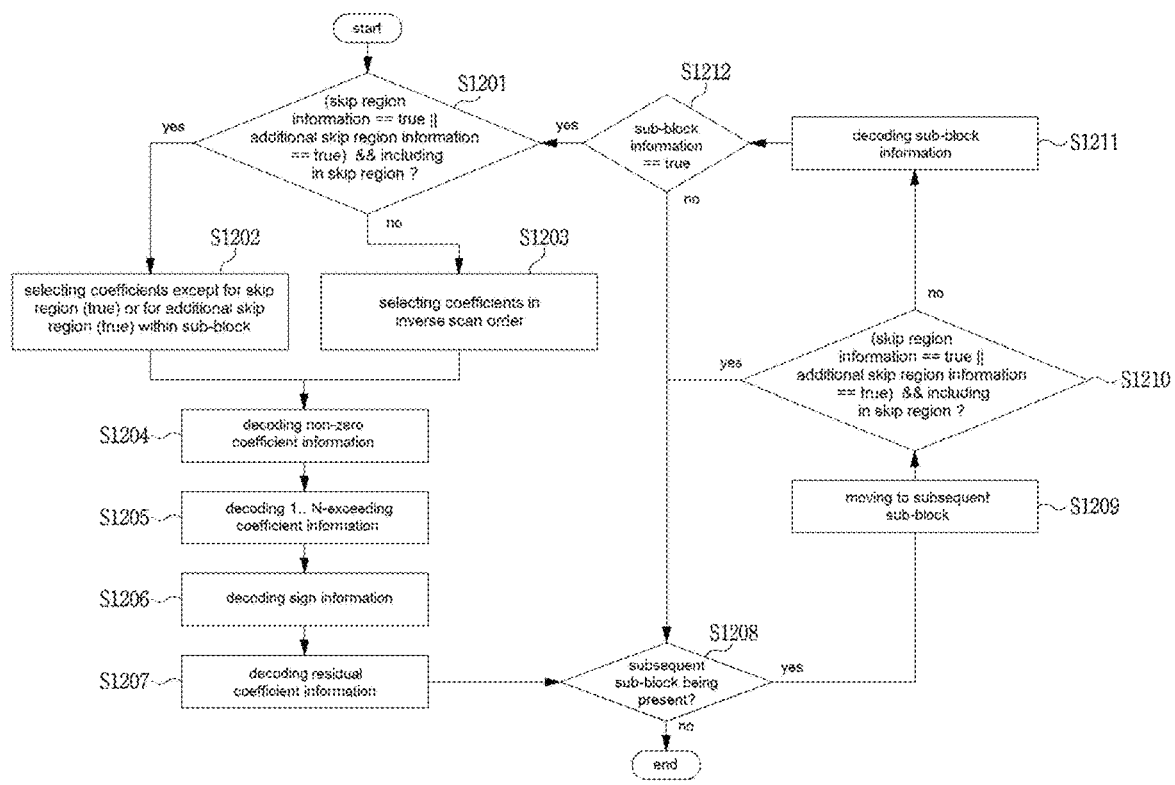
FIG. 12 is a view of a flowchart showing a method of decoding a transform block including a skip region or additional skip region according to an embodiment of the present invention.

FIG. 12 is a view of a flowchart showing a method of decoding a transform block including a skip region or additional skip region according to an embodiment of the present invention. The method shown in FIG. 12 may be performed after the method shown in FIG. 11. The decoding method of FIG. 12 may be performed by the entropy decoding module 20 of the image decoding device 200.

The method shown in FIG. 12 is a method substantially identically to the method shown in FIG. 10, and detailed description thereof will be omitted. However, in FIG. 10, skip region information, additional skip region information, Coded_sub_blk_flag of sub-block information, non-zero coefficient information, N-exceeding coefficient information, sign information, and residual coefficient information are encoded, but FIG. 12 differs in that the above information is decoded.

Algorithms shown in FIGS. 11 and 12 are additionally described by using an example of FIG. 7. After decoding Last_sig that is positional information of a reference coefficient in a current transform block, a reference coefficient is set. A skip region is set on the basis of the position of the reference coefficient, and skip region information is decoded. In the present example, the skip region information is true. The transform block is partitioned in units of sub-blocks, and a sub-block including the reference coefficient is decoded first.

Description is made by using an example where a current transform block has a size of 8×8 and a sub-block has a size of 4×4. For the first sub-block to be decoded, skip region information is true, and a coefficient to be decoded is present in the corresponding sub-block. As coefficients outside of the skip region are decoded, in case of the example shown in FIG. 7, the reference coefficient and 1, 0, 0, and −2 which are present above the reference coefficient are decoded.

Herein, a decoded value of non-zero coefficient information becomes true, false, false, and true, respectively. Assuming that N is 2, for a coefficient determined to be non-zero, 1-exceeding information is decoded. Coefficient values of 1 and −2 are decoded to have 1-exceeding information of false and true, respectively. 2-exceeding information is decoded when 1-exceeding information is true, coefficient values of −2 is decoded to have 2-exceeding information of false. Subsequently, signs of coefficient values of 1 and −2 which are + and − are respectively decoded. Subsequently, moving to a subsequent sub-block is performed as a subsequent sub-block is present.

For the second sub-block to be decoded, skip region information is true and a coefficient to be decoded is present in the corresponding sub-block, and thus sub-block information becomes true. Accordingly, 0, 0, and 1 which are coefficients outside of the skip region are decoded. Non-zero coefficient information of coefficients of 0, 0, and 1 are decoded as false, false, and true, respectively, and 1-exceeding information of the coefficient of 1 is decoded as false. Sign information of the coefficient of 1 is decoded as +, and moving to a subsequent sub-block is performed.

For the third sub-block to be decoded, skip region information is true, and a coefficient to be decoded is present in the corresponding sub-block, and thus sub-block information becomes true. When sorting for coefficients outside of the skip region is performed through inverse scanning, the result becomes 0, 0, 0, 0, 0, 1, 1, 1, 1, −2, −2, 1, −3, 3, and 10. The above coefficients are decoded by using S1204 to S1207.

Second Embodiment

Hereinafter, a second embodiment will be described with reference to the drawings.

A context-adaptive binary arithmetic process is performed for encoded information through binarization. A context-adaptive binary arithmetic process means a process of representing encoded information within a block as a symbol, differently applying a symbol occurrence probability by using probability information when necessary, and performing encoding. In the present embodiment, for convenience of description, symbols of 0 and 1 are used, but a number N of symbols (N is a natural number equal to or greater than 2) may be used.

Probability information refers to occurrence probabilities of 0 and 1 in binarized information. Occurrence probabilities of the two types of information may be identical or different according to previously reconstructed information. N pieces of probability information may be present according to information.

Figure 13:
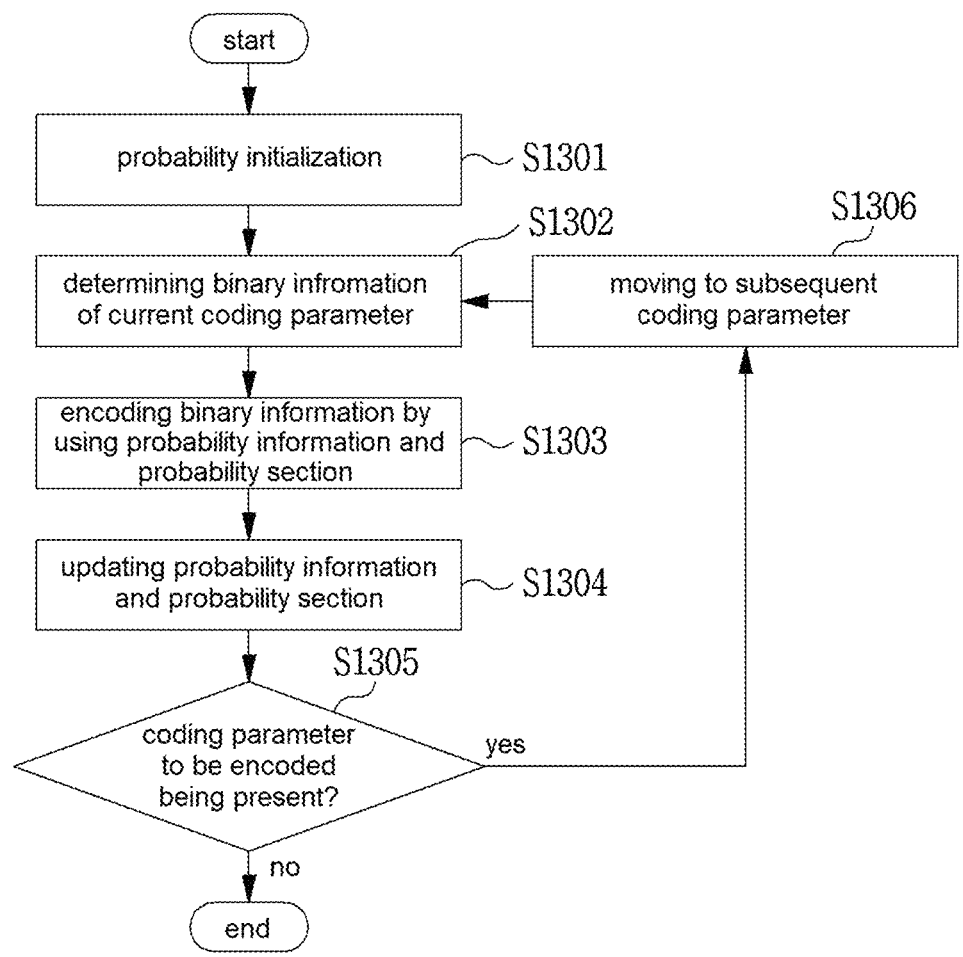
FIG. 13 is a view of a flowchart showing a context-adaptive binary arithmetic encoding method according to an embodiment of the present invention.

FIG. 13 is a view of a flowchart showing a context-adaptive binary arithmetic encoding method according to an embodiment of the present invention. First, in S1301 probability initialization is performed. Probability initialization is a process of dividing binarized pieces of information into a probability section by using a probability set in the probability information. However, for which probability information to use, the same condition that is preset arbitrarily according to a preset rule in the encoding device and the decoding device may be used, or additional piece of probability information may be encoded. An initial probability section may be identically determined according to a preset rule when performing encoding/decoding. Alternatively, an initial probability section may be used by performing new encoding.

In S1302, when binary information of a current coding parameter to be encoded is determined, in S1303, binarized information of the current coding parameter is encoded by using a probability section state before S1302, and by using previous probability information of the same coding parameter. In S1304, for binary information to be encoded afterwards, the probability information and the probability section are updated. In S1305, when coding parameter information to be encoded subsequently is present, in S1306, moving to the subsequent coding parameter information is performed so as to repeat the above described process. When coding parameter information to be encoded subsequently is not present, the present flowchart is ended.

Figure 14:
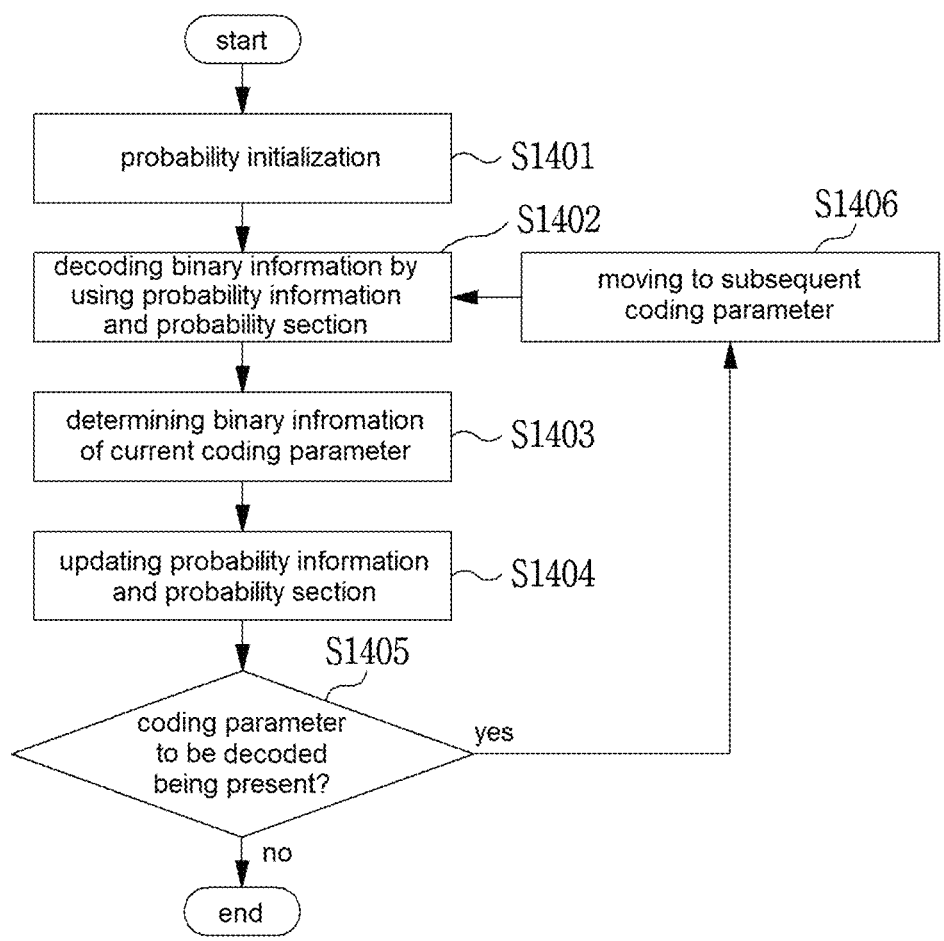
FIG. 14 is a view of a flowchart showing a context-adaptive binary arithmetic decoding method according to an embodiment of the present invention.

FIG. 14 is a view of a flowchart showing a context-adaptive binary arithmetic decoding method according to an embodiment of the present invention. Unlike the encoding device, in S1402, the decoding device decodes binary information of a coding parameter by using the probability information and section, and in S1403, determines binary information of a current coding parameter. In addition, the decoding method of FIG. 14 is in association with the encoding method of FIG. 13, and thus a detailed description thereof will be omitted.

In S1303 and S1402 of FIGS. 13 and 14 described above, encoding or decoding may be performed by selectively using optimal probability information among N preset pieces of probability information which is set by using neighbouring information that is already reconstructed for each coding parameter. For example, for probability information of information belonging to a quantized transform block, probability information having a high probability of information occurrence according to a size of the transform block may be used.

Alternatively, probability information may be differently applied according to information of neighbouring coefficients of a current coefficient to be encoded or decoded, or probability information of current information to be encoded or decoded may be selected by using probability information of information that is previously encoded or decoded.

FIGS. 15a to 15c are views respectively showing examples where probability information is differently applied according to information of neighbouring coefficients. FIG. 15b shows an example of a probability information table used when performing encoding or decoding a value of Sig_coeff_flag information of a current coefficient. Referring to FIG. 15b, among a current coefficient 1501 to be encoded or decoded and neighbouring coefficients, when a number of coefficients having a value of information identical to a value of 1 that is a value of Sig_coeff_flag information of the current coefficient 1501 is one, the current coefficient 1501 is assigned to have an index of 8. Herein, a probability of a symbol of 1 which is Sig_coeff_flag binary information of the current coefficient 1501 becomes 61%, and a probability of a symbol of 0 becomes 39%. When a number of coefficients having a value of information identical to a value of Sig_coeff_flag information of the current coefficient 1501 is two, the current coefficient 1501 is assigned to have an index of 5. Herein, a probability of a symbol of 1 which is Sig_coeff_flag binary information of the current coefficient 1501 becomes 71%, and a probability of a symbol of 0 becomes 29%. When a number of coefficients having a value of information identical to a value of Sig_coeff_flag information of the current coefficient 1501 is three, the current coefficient 1501 is assigned to have an index of 2. Herein, a probability of a symbol of 1 which is Sig_coeff_flag binary information of the current coefficient 1501 becomes 87%, and a probability of a symbol of 0 becomes 13%. By using the probability information table shown in FIG. 15b, probability information may be updated as FIG. 15c after encoding or decoding the current coefficient 1501.

Meanwhile, for Sig_coeff_flag of non-zero coefficient information, probability information where an occurrence probability of the non-zero coefficient information is high may be used close to a low frequency region. For probability information of N-exceeding coefficient information, probability information of current N-exceeding coefficient information may be set by using probability information of N-exceeding coefficient information that is just previously encoded/decoded, or probability information of N-exceeding coefficient information that is encoded/decoded first in units of sub-block may be used as it is. For sub-block information, probability information of M neighbouring sub-blocks that are encoded/decoded may be used or probability information of a sub-block that is just previously encoded/decoded may be used.

Figure 16A:
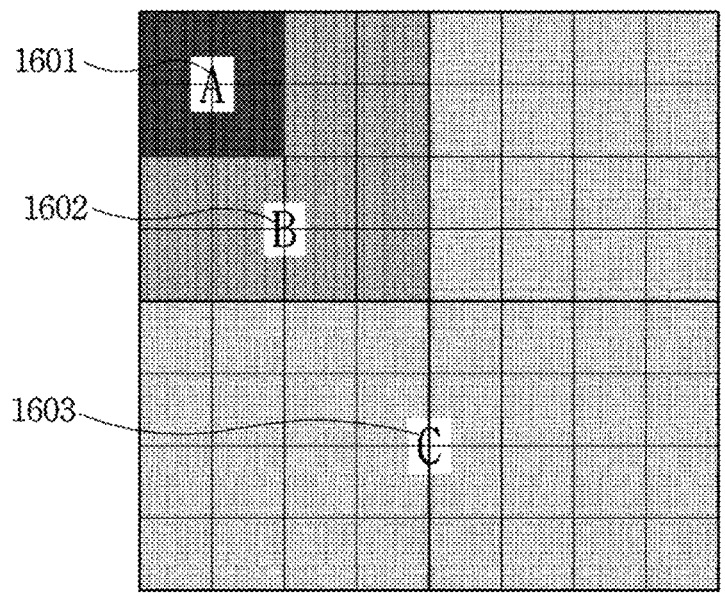
FIGS. 16a to 16c are views respectively showing various examples of partitioning a transform block of a frequency region into a plurality of regions.
Figure 16B:
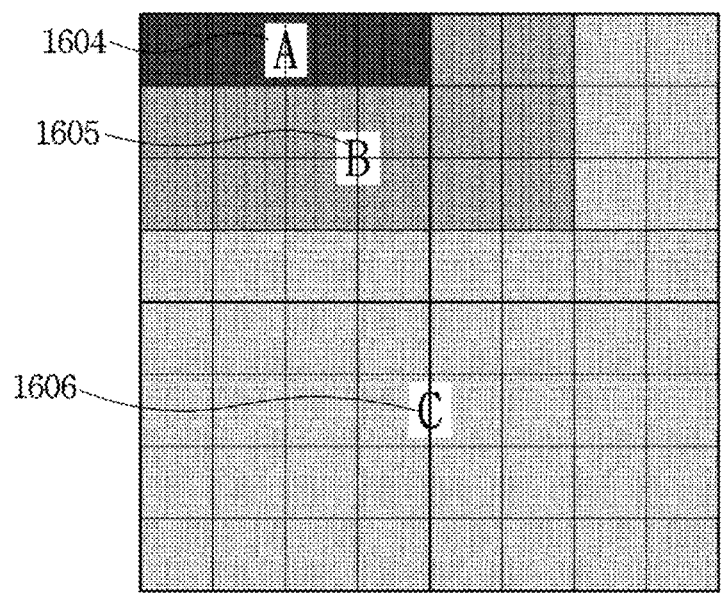
Figure 16C:
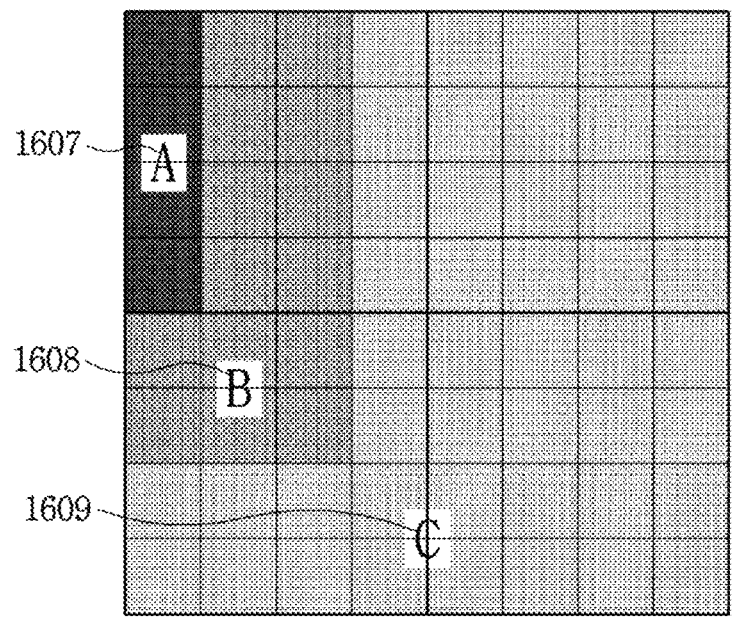

FIGS. 16a to 16c are views showing various examples of partitioning a transform block of a frequency region into a plurality of regions. Referring to FIGS. 16a to 16c, a transform block may be divided into three regions which are a frequency region A (1601, 1604, 1607), a frequency region B (1602, 1605, 1608), and a frequency region C (1603, 1606, 1609). Each region may be adaptively determined according to a scan direction of the transform block, FIG. 16a shows an example of frequency region division where a scan direction of the transform block is a diagonal direction, FIG. 16b shows an example of frequency region division where a scan direction is a horizontal direction, and FIG. 16c shows an example of frequency region division where a scan direction is a vertical direction. Probability information may be set for each region by using the frequency region A (1601, 1604, 1607) that is a low frequency region where an occurrence probability of non-zero coefficient information is high, the frequency region B (1602, 1605, 1608) that is a region where non-zero coefficient information occurs less than the region A (1601, 1604, 1607), and the frequency region C (1603, 1606, 1609) that is a high frequency region where non-zero coefficient information occurs at least than the region A (1601, 1604, 1607), and the region B (1602, 1605, 1608). Dividing into the frequency region A (1601, 1604, 1607), the frequency region B (1602, 1605, 1608), and the frequency region C (1603, 1606, 1609) may be performed according to a distance from a DC coefficient at a position of an upper left corner of the transform block.

Referring aging the probability information table of the FIG. 15b, when a current coefficient to be encoded or decoded belongs to the region A (1601, 1604, 1607), the current coefficient is assigned to have an index of 8, and a probability of a symbol of 1 becomes 61% and a probability of a symbol of 0 becomes 39%. When a current coefficient belongs to the region B (1602, 1605, 1608), the current coefficient is assigned to have an index of 5, and a probability of a symbol of 1 becomes 71% and a probability of a symbol of 0 becomes 29%. When a current coefficient belongs to the region C (1603, 1606, 1609), the current coefficient is assigned to have an index of 2, and a probability of a symbol of 1 becomes 87% and a probability of a symbol of 0 becomes 13%. By using the probability information table shown in FIG. 15b, probability information may be updated as shown in FIG. 15c after encoding or decoding the current coefficient.

For probability information of non-zero coefficient information, N-exceeding coefficient information, and sub-block information, probability information where an occurrence probability is high may be used close to the region A (1601, 1604, 1607), and probability information of N-exceeding coefficient information may be selected by referring to non-zero coefficient information. Frequency region division may be performed by using the same condition in the encoding/decoding device, or additional division information may be encoded and transmitted to the decoding device.

Figure 17:
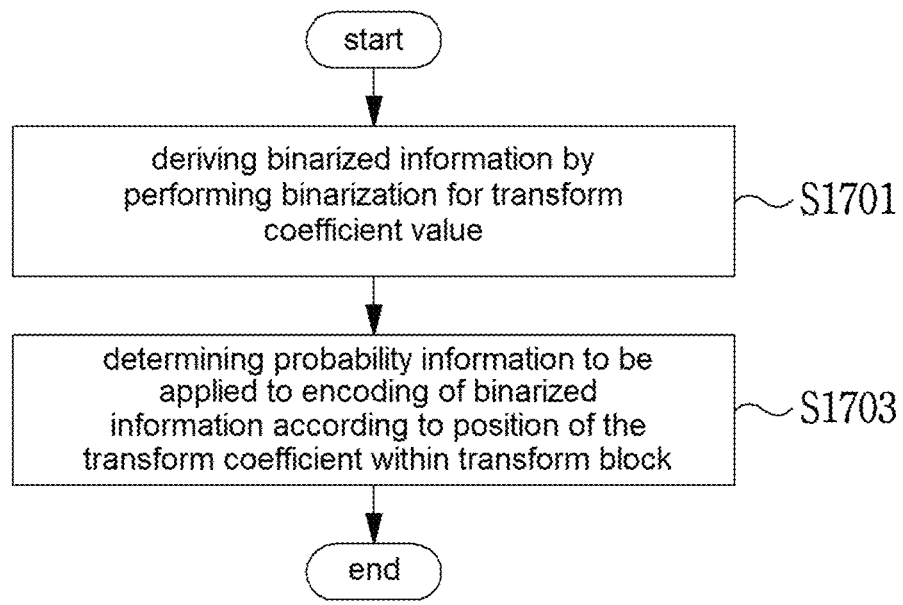
FIG. 17 is a view of a flowchart showing an arithmetic encoding method according to an embodiment of the present invention.

FIG. 17 is a view of a flowchart showing an arithmetic encoding method according to an embodiment of the present invention. Referring to FIG. 17, in S1701, binarized information is derived by performing binarization for a value of a coefficient to be encoded. In S1703, probability information to be applied to encoding of the binarized information is determined according to a position of the transform coefficient within the transform block. Referring to an example shown in FIG. 16a, probability information to be applied may be determined according to which region a current coefficient to be encoded belongs among the frequency region A (1601), the frequency region B (1602), and the frequency region C (1603). Herein, dividing into the frequency region A (1601), the frequency region B (1602), and the frequency region C (1603) may be performed according to a distance from a DC coefficient at a position of an upper left corner of the transform block.

Figures 18, 19A:
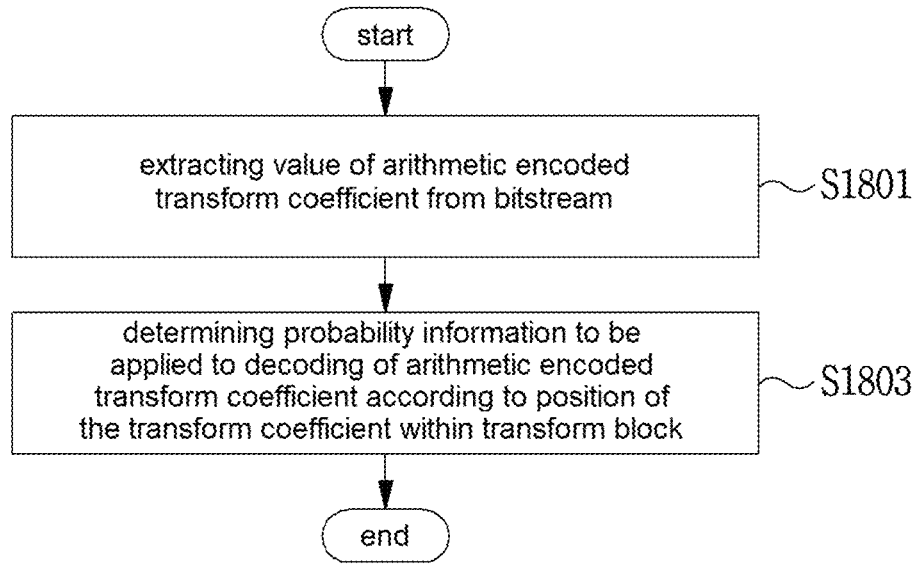
FIG. 18 is a view of a flowchart showing an arithmetic decoding method according to an embodiment of the present invention.
FIGS. 19a to 19c are views showing arithmetic encoding and arithmetic decoding according to another embodiment of the present invention.

FIG. 18 is a view of a flowchart showing an arithmetic decoding method according to an embodiment of the present invention. Referring to FIG. 18, in S1801, a value of an arithmetic encoded transform coefficient is extracted from a bitstream. In S1803, probability information to be applied to decoding of the arithmetic encoded transform coefficient is determined according to a position of the transform coefficient within the transform block. As described above, referring to the example shown in FIG. 16a, probability information to be applied may be determined according to which region a current coefficient to be decoded belongs among the frequency region A (1601), the frequency region B (1602), and the frequency region C (1603). Herein, dividing into the frequency region A (1601), the frequency region B (1602), and the frequency region C (1603) may be performed according to a distance from a DC coefficient at a position of an upper left corner of the transform block.

Arithmetic encoding and arithmetic decoding according to another embodiment of the present invention will be described with reference to FIGS. 19a to 19c, and 20.

In the present embodiment, when a method of encoding a quantized transform coefficient by using a skip region shown in FIGS. 7 to 9 is used, probability information different from each other may be used for encoding or decoding current information according to whether the skip region is used or not.

Figures 19B, 19C, 20:
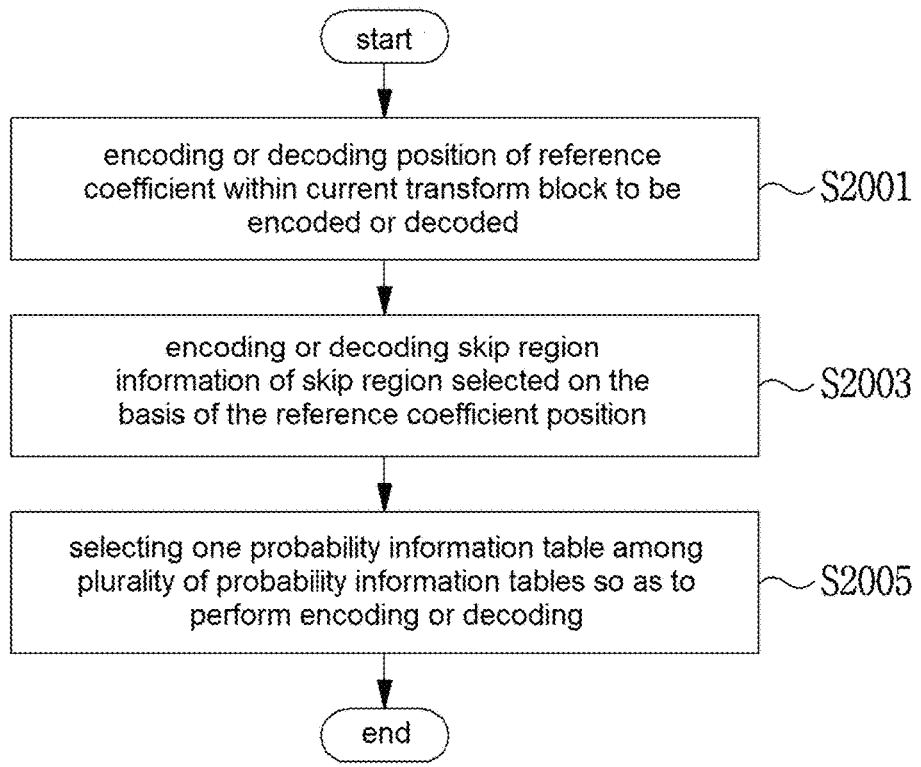
FIG. 20 is a view of a flowchart showing an arithmetic encoding method or decoding method according to another embodiment of the present invention.

In order to encode or decode a current coefficient 1901 shown in FIG. 19a, it is assumed that a probability information table shown in FIG. 19b or 19c is used. The probability information table shown in FIG. 19b is a probability information table applied when the skip region is not used, and the probability information table shown in FIG. 19c is a probability information table applied when the skip region is used.

Referring to FIG. 19a, the skip region is present in a transform block or sub-block to which a current coefficient 1901 belongs, and thus the probability information table shown in FIG. 19c is used for encoding or decoding the current coefficient 1901. Accordingly, for example, the current coefficient 1901 is assigned to have an index of 5. Herein, a probability of a symbol of 1 becomes 71% and a probability of a symbol of 0 becomes 29%.

Alternatively, probability information may be differently applied according to a number of N-exceeding coefficients in neighbouring coefficients. For non-zero coefficient information and N-exceeding coefficient information, probability information where an occurrence probability is high according to a number of pieces of neighbouring information that are encoded/decoded may be used, and a position of a frequency region. For a coefficient positioned around the skip region and positioned in the frequency region C, non-zero coefficient information, N-exceeding coefficient information, and probability information where an occurrence probability of sub-block information is low may be applied.

FIG. 20 is a view of a flowchart showing an arithmetic encoding or decoding method according to another embodiment of the present invention. As described with reference to FIGS. 19a to 19c, probability information different from each other is used when encoding or decoding current information according to whether or not a skip region is used.

Referring to FIG. 20, in S2001, first, a position of a reference coefficient within a current transform block to be encoded or decoded is encoded or decoded. Subsequently, in S2003, skip region information of a skip region selected on the basis of the position of the reference coefficient is encoded or decoded. When binarized information is obtained by performing binarization for a value of a transform coefficient that is not included in the skip region, in S2005, among a plurality of probability information tables, the probability information table to be applied to encoding of the binarized information is selected. Herein, the plurality of probability information tables include a table for a case where the skip region is used, and at least two tables for cases where the skip region is not used.

A context-adaptive binary arithmetic process is performed for encoded information through binarization. A context-adaptive binary arithmetic process means a process of representing encoded information within a block as a symbol, differently applying a symbol occurrence probability by using probability information when necessary, and performing encoding. In the present embodiment, for convenience of description, symbols of 0 and 1 are used, but a number N of symbols (N is a natural number equal to or greater than 2) may be used.

Probability information refers to occurrence probabilities of 0 and 1 in binarized information. An occurrence probability of the two types of information may be identical or different according to previously reconstructed information. N pieces of probability information may be present according to information.

Figure 21:
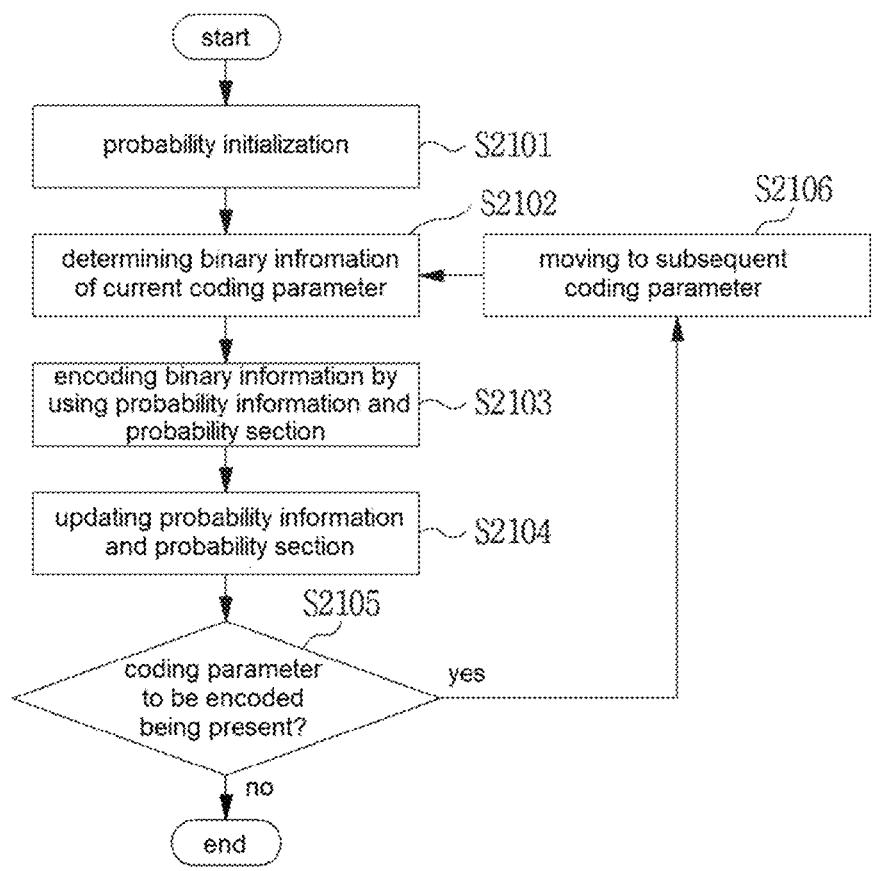
FIG. 21 is a view of a flowchart showing a context-adaptive binary arithmetic encoding method according to an embodiment of the present invention.

FIG. 21 is a view of a flowchart showing a context-adaptive binary arithmetic encoding method. In S2101, probability initialization is performed. Probability initialization is a process of dividing binarized pieces of information into a probability section by using a probability set in the probability information. However, for which probability information to use, the same condition that is preset arbitrarily according to a preset rule in the encoding device and the decoding device may be used, or additional piece of probability information may be encoded. An initial probability section may be identically determined according to a preset rule when performing encoding/decoding. Alternatively, an initial probability section may be used by performing new encoding.

In S2102, when binary information of a current coding parameter to be encoded is determined, in S2103, binarized information of the current coding parameter is encoded by using a probability section state before S2102 of FIG. 21, and by using previous probability information of the same coding parameter. Subsequently, in S2104, the probability information and the probability section may be updated for binary information to be encoded later. Subsequently, in S2105, when coding parameter information that is subsequently encoded is present, in S2106, moving to the subsequent coding parameter information is performed so as to repeat the above described process. When coding parameter information to be encoded subsequently is not present, the present flowchart is ended.

FIG. 22 is a view of a flowchart showing a context-adaptive binary arithmetic decoding method. Unlike the encoding device, the decoding device decodes, in S2202, binary information of a coding parameter by using probability information and section, and in S2203, determines binary information of the current coding parameter. In addition, the decoding method of FIG. 22 is in association with the encoding method of FIG. 21, and thus detailed description thereof will be omitted.

In S2103 and S2202 of FIGS. 21 and 22 described above, encoding or decoding may be performed by selectively using optimal probability information among N preset pieces of probability information which are set by using neighbouring information (or coding parameter) that is already reconstructed for each coding parameter.

For example, for probability information of information (or coding parameter) belonging to a quantized transform block, probability information where an information occurrence probability is high according to a size of the transform block may be used.

Alternatively, probability information may be differently applied according to information of neighbouring coefficients of a current coefficient to be encoded or decoded, or probability information of current information to be encoded or decoded may be selected by using probability information of information that is previously encoded or decoded.

FIGS. 23a and 23b are views respectively showing examples where probability information is differently applied according to information of neighbouring coefficients.

FIG. 23a is a view of an example of a probability information table used when encoding or decoding a value of Sig_coeff_flag information of a current coefficient. Among coefficients around the current coefficient to be encoded or decoded, when a number of coefficients having a value of information identical to a value of Sig_coeff_flag information of the current coefficient is one, the current coefficient is assigned to have an index of 8. Herein, a probability of a symbol of 1 that is Sig_coeff_flag binary information of the current coefficient becomes 61% and a probability of a symbol of 0 becomes 39%. When a number of neighbouring coefficients having a value of information identical to a value of Sig_coeff_flag information of the current coefficient is two, the current coefficient is assigned to have an index of 5. Herein, a probability of a symbol of 1 of Sig_coeff_flag binary information of the current coefficient becomes 71%, and a probability of a symbol of 0 becomes 29%. When a number of neighbouring coefficients having a value of information identical to a value of Sig_coeff_flag information of the current coefficient is three, the current coefficient is assigned to have an index of 2. Herein, a probability of a symbol of 1 of Sig_coeff_flag binary information of the current coefficient becomes 87%, and a probability of a symbol of 0 becomes 13%.

By using the probability information table shown in FIG. 23a, probability information may be updated as FIG. 23b after encoding or decoding the current coefficient.

Meanwhile, for Sig_coeff_flag of non-zero coefficient information, probability information where an occurrence probability of Sig_coeff_flag of non-zero coefficient information is high may be used close to a low frequency region.

In addition, for probability information of N-exceeding coefficient information, probability information of current N-exceeding coefficient information may be set by using probability information of N-exceeding coefficient information that is just previously encoded/decoded, or probability information of N-exceeding coefficient information that is encoded/decoded first in units of sub-blocks may be used as it is. As described above, N-exceeding coefficient information may include Abs_greater1_flag, Abs_greater2_flag, Abs_greater3_flag, etc.

In addition, for Coded_sub_blk_flag of sub-block information, probability information of M neighbouring sub-blocks that are encoded/decoded may be used, or probability information of a sub-block that is just previously encoded/decoded may be used.

Third Embodiment

Figure 24:
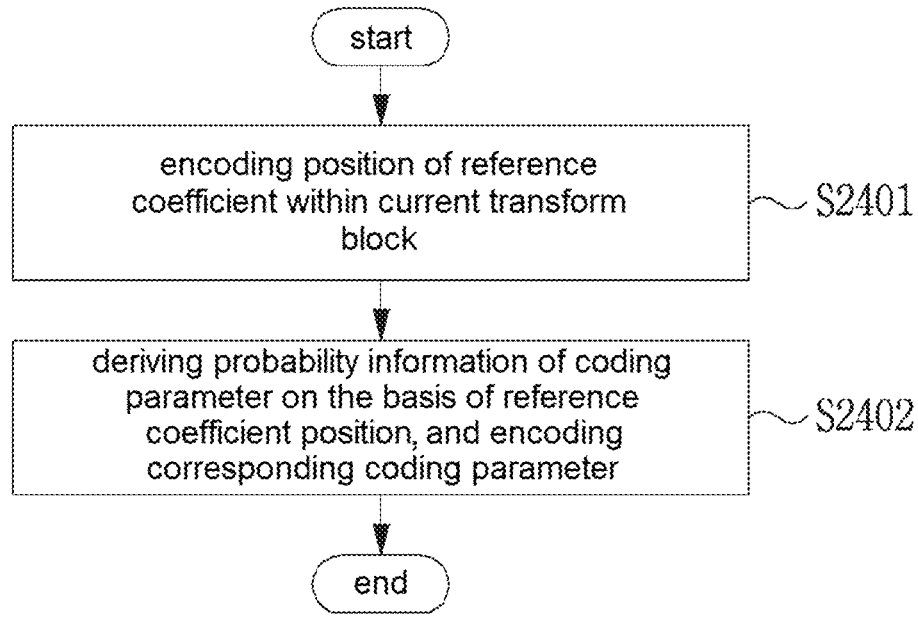
FIG. 24 is a view of a flowchart showing a method of deriving probability information on the basis of a reference coefficient according to an embodiment of the present invention.

FIG. 24 is a view of a flowchart showing a method of determining probability information of each coding parameter according to a position of a reference coefficient, and encoding information of each coding parameter by using the same according to an embodiment of the present invention. The flowchart of FIG. 24 may be performed by the entropy encoding module 107 of the image encoding device 100.

Referring to FIG. 24, in S2401, first, the entropy encoding module 107 encodes a position of a reference coefficient within a current transform block to be encoded. Herein, the position of the reference coefficient may be encoded to Last_sig of reference coefficient position information.

As described above, the reference coefficient may mean the first non-zero coefficient when scanning coefficients in an inverse scan order, but may be determined according to conditions different from each other identically set in the image encoding device 100 and the image decoding device 200.

Subsequently, in S2402, probability information of each coding parameter is derived on the basis of the position of the reference coefficient, and the corresponding coding parameter is encoded.

Figure 25:
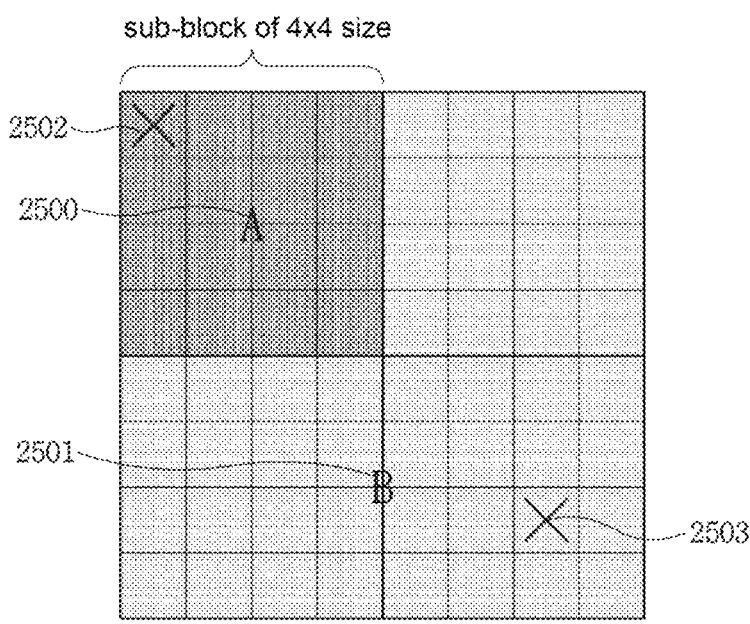
FIG. 25 is a view showing a position of a reference coefficient according to an embodiment of the present invention.

Herein, a method of setting a probability table according to the position of the reference coefficient refers to the example of FIG. 25.

Referring to FIG. 25, a region A (2500) means an arbitrary region closest to a DC coefficient within a transform block, a region B (2501) means a region within the transform block other than the region A (2500). In addition, the transform block may be partitioned into at least N regions. Herein, arbitrary region information representing the region A may be transmitted in a parent header, or may be determined by using the same condition according to a shape of the transform block in the image encoding device 100 and the image decoding device 200.

In FIG. 25, according to which region the position of the reference coefficient is present in between the region A (2500) and the region B (2501), probability information of coding parameters may be differently derived within a single probability table, and the probability information of the coding parameters may be updated.

Alternatively, according to which region the position of the reference coefficient is present in between the region A and the region B, probability information of coding parameters may be updated by independently using at least two initial probability tables different from each other, or by independently using the same initial probability table.

A detailed example of the above-described method will be described below.

In order to derive probability information of Sig_coeff_flag information representing whether or not each coefficient within a transform block is 0, when encoding is performed by independently using the same two initial probability tables, a table 2600 of FIG. 26a is used when the reference coefficient of the transform block is present in the region A (2500), and a table 2601 of FIG. 26a is used when the same is present in the region B (2501). Accordingly, probability information of Sig_coeff_flag information may be independently updated.

The probability table 2602 of FIG. 26b is a result where probability information is updated as probability table index information is determined as 5 according to the reference coefficient position in the initial probability table 2600 of FIG. 26a, and the probability table 2603 of FIG. 26b is a result where probability information is updated as probability table index information is determined as 8 according to the reference coefficient position in the initial probability table 2600 of FIG. 26a.

By the same principle as the example described above, for probability information of Abs_greater1_flag information that represents whether or not an absolute value of a coefficient within a transform block is greater than 1, probability information is selected where a probability of Abs_greater1_flag information is high to be 1 when the reference coefficient is present in the region A, and probability information is selected where a probability of Abs_greater1_flag information is high to be 0 when the reference coefficient is present in the region B so as to perform encoding.

Meanwhile, in a method of determining index information representing which probability to use within a probability table, index information may be determined according to detailed coordinates of the reference coefficient.

For example, when detailed coordinates of the reference coefficient within the transform block are positioned at the uppermost leftmost of the region A (2502 of FIG. 25), index information of the probability table according to the reference coefficient position within the initial probability table 2600 of FIG. 26a may be determined as 5. In addition, the probability information of the index information being 5 may be updated as the probability table 2602 of FIG. 26b.

In addition, when detailed coordinates of the reference coefficient within the transform block are positioned in the middle of the region B (2503 of FIG. 25), index information of the probability table according to the initial probability table 2601 of FIG. 26a may be determined as 8. In addition, the probability information of the index information being 8 may be updated as the probability table 2603 of FIG. 26b.

Figure 27:
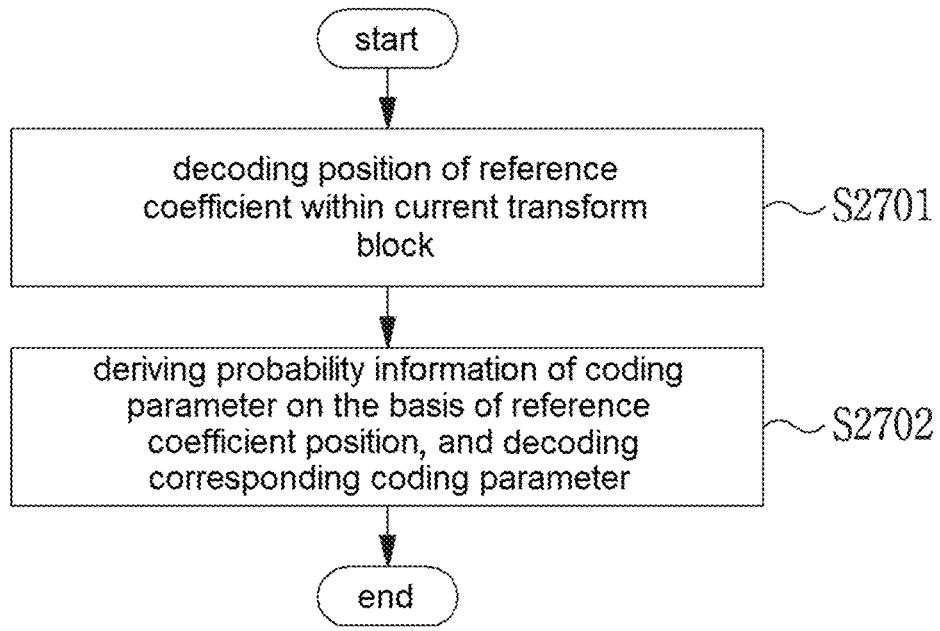
FIG. 27 is a view of a decoding flowchart showing a method of deriving probability information on the basis of a reference coefficient according to an embodiment of the present invention.

FIG. 27 is view showing a method of determining probability information of each coding parameter according to a reference coefficient position, and decoding information of each coding parameter by using the same according to an embodiment of the present invention. The decoding method of FIG. 27 may be performed by the entropy decoding module 201 of the image decoding device 200.

Referring to FIG. 27, in S2701, first, the entropy decoding module 201 decodes a position of a reference coefficient within a current transform block to be decoded. As described above, the reference coefficient means the first non-zero coefficient when performing scanning for coefficients in an inverse scan order. Subsequently, in S2702, probability information of each coding parameter is derived on the basis of the position of the reference coefficient, and information of the corresponding coding parameter is decoded.

Fourth Embodiment

Figure 28:
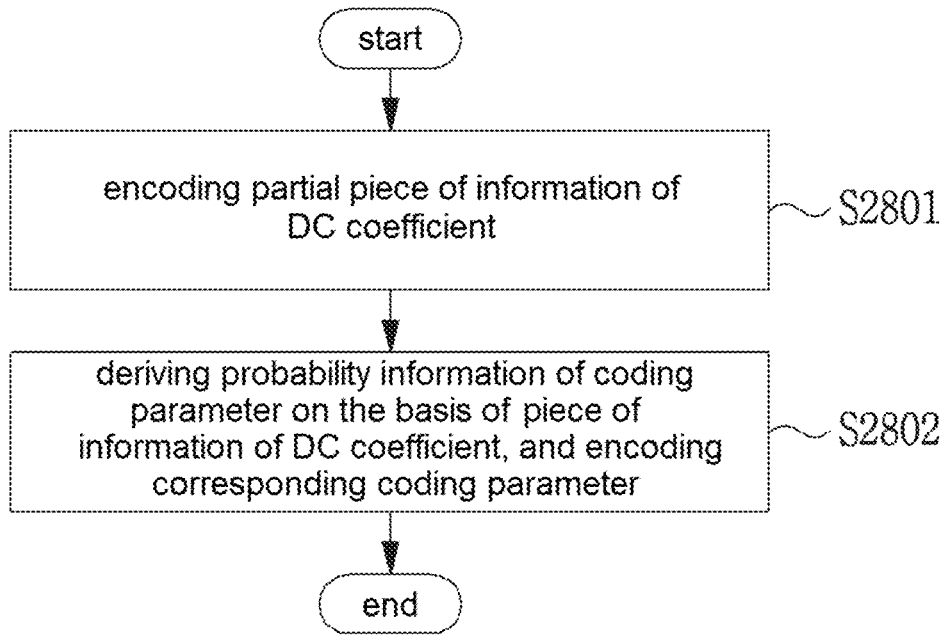
FIG. 28 is a view of an encoding flowchart showing a method of deriving probability information on the basis of a partial piece of information of a DC according to an embodiment of the present invention.

FIG. 28 is a view according to an embodiment of the present invention, and shows a flowchart of a method of deriving and encoding probability information of each coding parameter according to a partial piece of information of a DC coefficient. The encoding method of FIG. 28 may be performed by the entropy encoding module 107 of the image encoding device 100.

Referring to FIG. 28, in S2801, a partial piece of information of a DC coefficient is encoded, and in S2802, probability information of each coding parameter is derived on the basis of the partial piece of information of the DC coefficient, and information of the corresponding parameter is encoded.

Herein, the DC coefficient may be a coefficient positioned at the uppermost and leftmost of the transform block, or may be the last non-zero coefficient (coefficient other than 0) in an inverse scan order.

In addition, herein, the partial piece of information of the DC coefficient means a partial piece of information required for encoding and decoding the DC coefficient. For example, the partial piece of information of the DC coefficient may mean at least one of Sig_coeff_flag information of the DC coefficient and Abs_greater1_flag information of the DC coefficient.

Probability information of coding parameters other than the partial piece of information of the DC coefficient may be differently derived within a single probability table on the basis of the partial piece of information of the DC coefficient, and the probability information of the coding parameters may be updated.

Alternatively, on the basis of the partial piece of information of the DC coefficient, probability information of coding parameters may be updated by independently using at least two initial probability tables different from each other, or by independently using the same initial probability table.

A detailed example of the above-described method will be described below.

In order to derive probability information of Sig_coeff_flag information representing whether or not each coefficient within a transform block is 0, encoding may be performed by independently using the same two initial probability tables, and Sig_coeff_flag information may be used as a partial piece of information of a DC coefficient. When the partial piece of information of the DC coefficient is 0, a table 2600 of FIG. 26a may be used, and when the partial piece of information of the DC coefficient is 1, a table 2601 of FIG. 26a may be used. Accordingly, probability information of Sig_coeff_flag information may be independently updated.

By the same principle as the example described above, for probability information of Abs_greater1_flag information that represents whether or not an absolute value of a coefficient within a transform block is greater than 1, probability information is selected where a probability of Abs_greater1_flag information is high to be 1 when Sig_coeff_flag that is the partial piece of information of the DC coefficient is 1, and probability information is selected where a probability of Abs_greater1_flag information is high to be 0 when Sig_coeff_flag that is the partial piece of information of the DC coefficient is 0 so as to perform encoding.

In a method of determining index information representing which probability to use within a probability table, index information may be determined according to a partial piece of information of a DC coefficient.

For example, when Sig_coeff_flag information of a current coefficient to be encoded is 1, index information of the initial probability table 2600 of FIG. 26a may be determined as 5. In addition, probability information of index information being 5 may be updated as the probability table 2602 of FIG. 26b.

In addition, when Sig_coeff_flag information of the current coefficient to be encoded is 0, index information of an initial probability table 2601 of FIG. 26a may be determined as 8. In addition, probability information of index information being 8 may be updated as the probability table 2603 of FIG. 26b.

Figure 29:
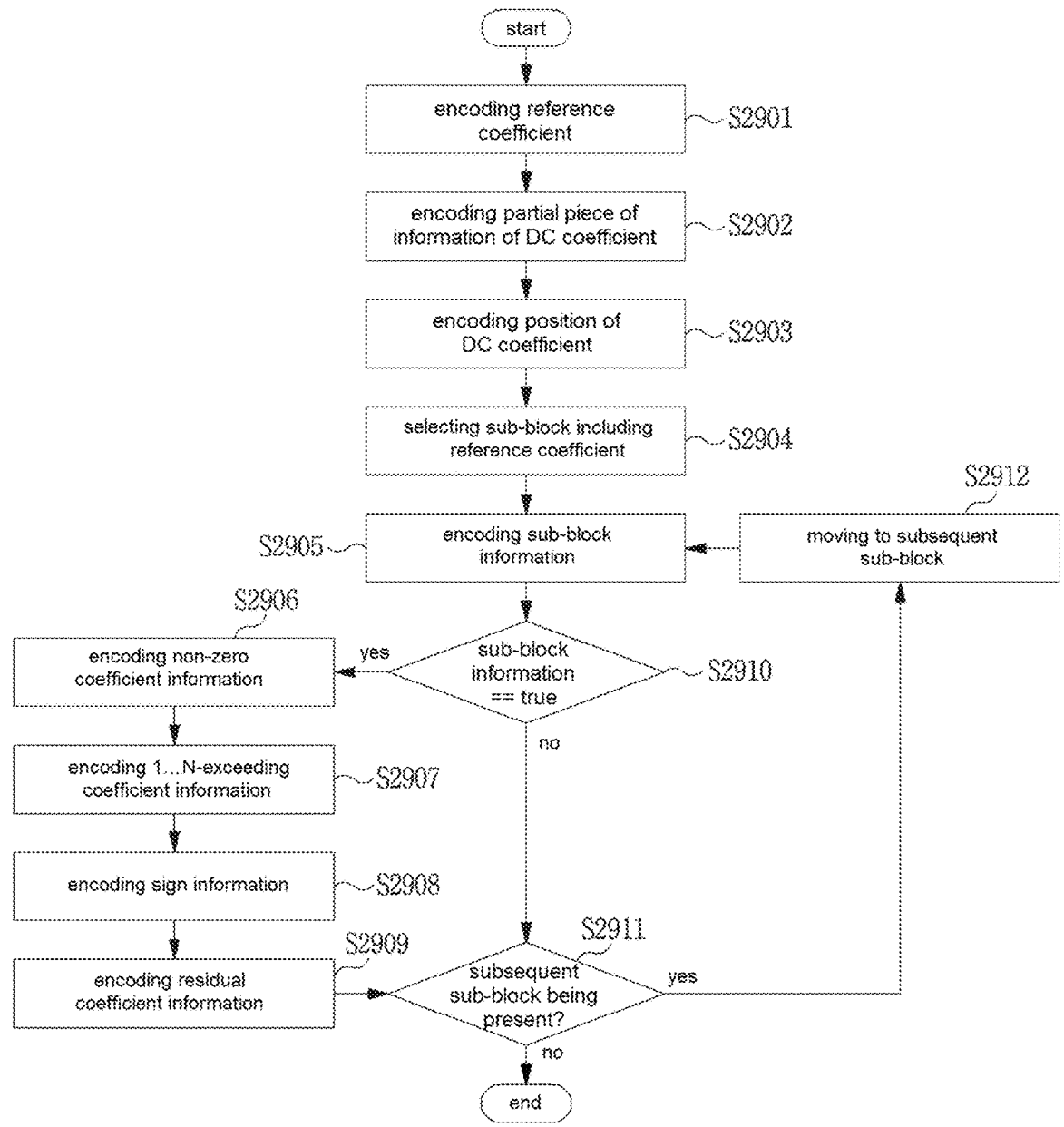
FIG. 29 is a view of a flowchart showing a method of encoding transform block coefficients by using a partial piece of information of a DC coefficient.

FIG. 29 is a view of a flowchart showing a method of encoding transform block coefficients by using a partial piece of information of a DC coefficient.

In S2901, reference coefficient information is encoded, and in S2902, a partial piece of information of a DC coefficient is encoded. Herein, when a position of the DC coefficient is preset in the encoding/decoding device, encoding of the position of the DC coefficient may be omitted. Otherwise, in S2903, the position of the DC coefficient is encoded. When a reference coefficient is included in a sub-block within a transform block, it means that a coefficient to be encoded is included, and thus Coded_sub_blk_flag that is sub-block information is not encoded. Subsequently, encoding is performed in an order of S2906 of encoding non-zero coefficient information of coefficients, S2907 of encoding N-exceeding coefficient information, S2908 of encoding sign information, and S2909 of encoding residual coefficient information. However, the partial piece of information of the DC coefficient has been encoded already, and thus in S2906 to S2909, using the partial piece of information of the DC coefficient when encoding the DC coefficient may be omitted.

Subsequently, in S2911, when a subsequent sub-block is present, in S2912, moving to the subsequent sub-block is performed. Subsequently, information is encoded in an order of S2906 to S2909, and when a subsequent sub-block is not present, the algorithm is ended.

Figure 30:
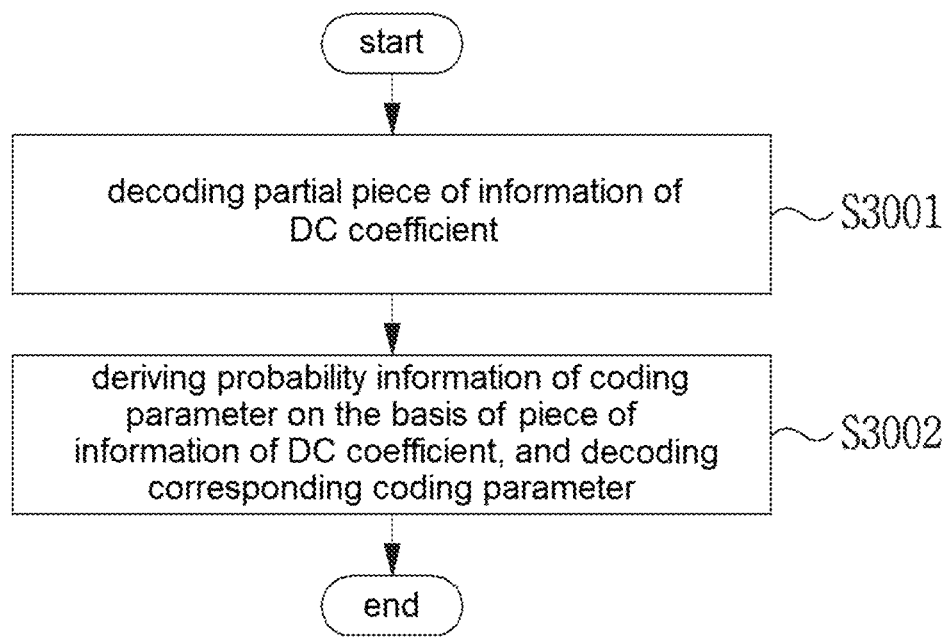
FIG. 30 is a view of a decoding flowchart showing a method of deriving probability information on the basis of a partial piece of information of a DC coefficient according to an embodiment of the present invention.

FIG. 30 is a view according to an embodiment of the present invention, and is a flowchart showing a method of deriving and decoding probability information of each coding parameter according to a partial piece of information of a DC coefficient. The decoding method of FIG. 30 may be performed by the entropy decoding module 201 of the image decoding device 200.

Referring to FIG. 30, in S3001, first, the entropy decoding module 201 decodes a partial piece of information of a DC coefficient, and in S3002, derives probability information of each coding parameter on the basis of the partial piece of information of the DC coefficient, and decodes information of the corresponding parameter.

Figure 31:
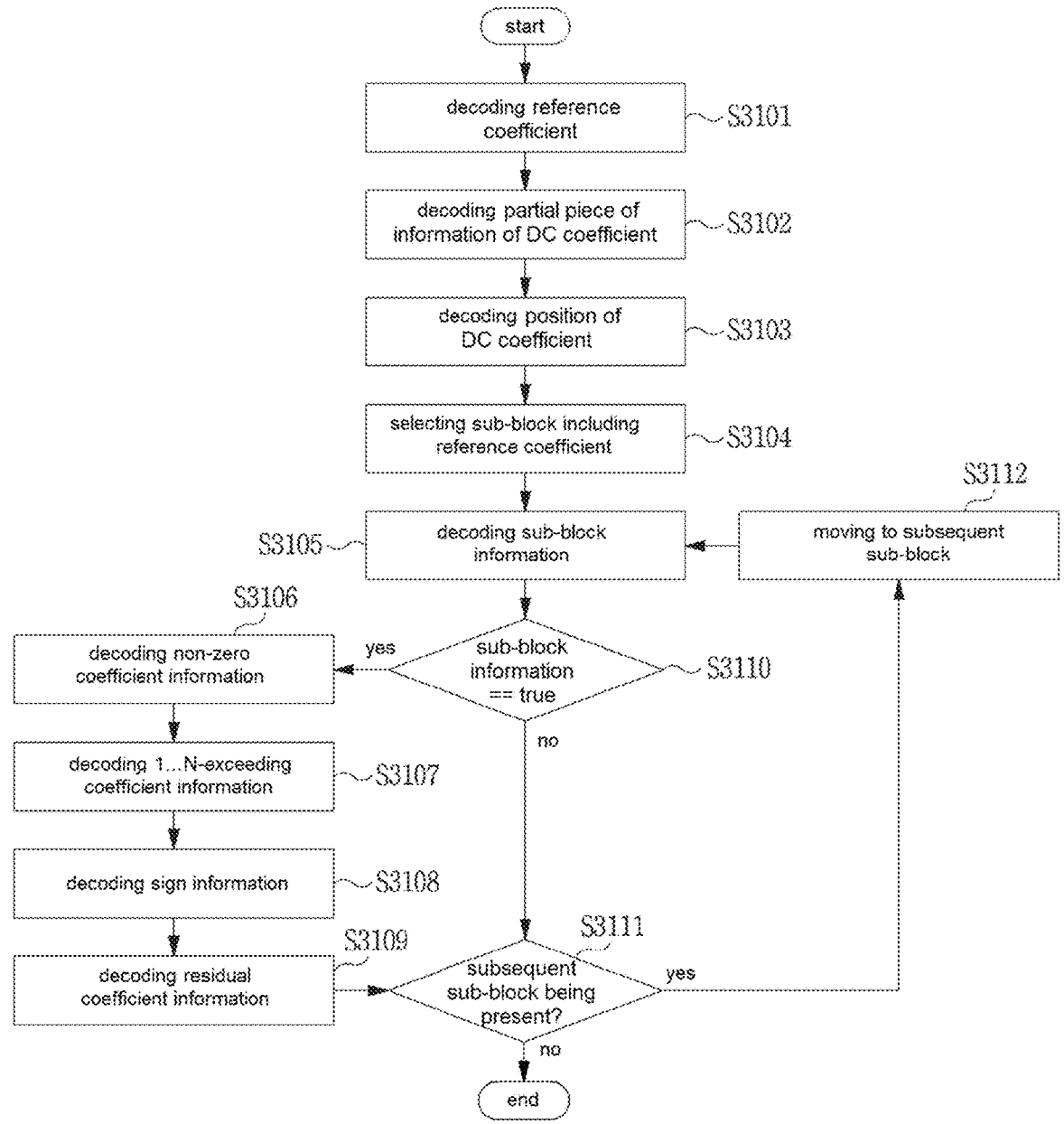
FIG. 31 is a view of a flowchart showing a method of decoding transform block coefficients by using a partial piece of information of a DC coefficient.

FIG. 31 is a view of a flowchart showing a method of decoding transform block coefficients by using a partial piece of information of a DC coefficient.

In S3101, reference coefficient information is decoded, and in S3102, the partial piece of information of the DC coefficient is decoded. Herein, when a position of the DC coefficient is preset in the encoding/decoding device, decoding of the position of the DC coefficient may be omitted. Otherwise, in S3103, the position of the DC coefficient is decoded. When the reference coefficient is included in a sub-block within a transform block, it means that a coefficient to be decoded is included, and thus Coded_sub_blk_flag that is sub-block information is not decoded. Subsequently, decoding is performed in an order of S3106 of decoding non-zero coefficient information of coefficients, S3107 of decoding N-exceeding coefficient information, S3108 of decoding sign information, and S3109 of decoding residual coefficient information. However, the partial piece of information of the DC coefficient has been decoded already, and thus in S3106 to S3109, using the partial piece of information of the DC coefficient when decoding the DC coefficient decode may be omitted.

Subsequently, in S3111, when a subsequent sub-block is present, in S3112, moving to the subsequent sub-block is performed. Subsequently, information is decoded in an order of S3106 to S3109, and when a subsequent sub-block is not present, the algorithm is ended.

Fifth Embodiment

Figures 32, 33:
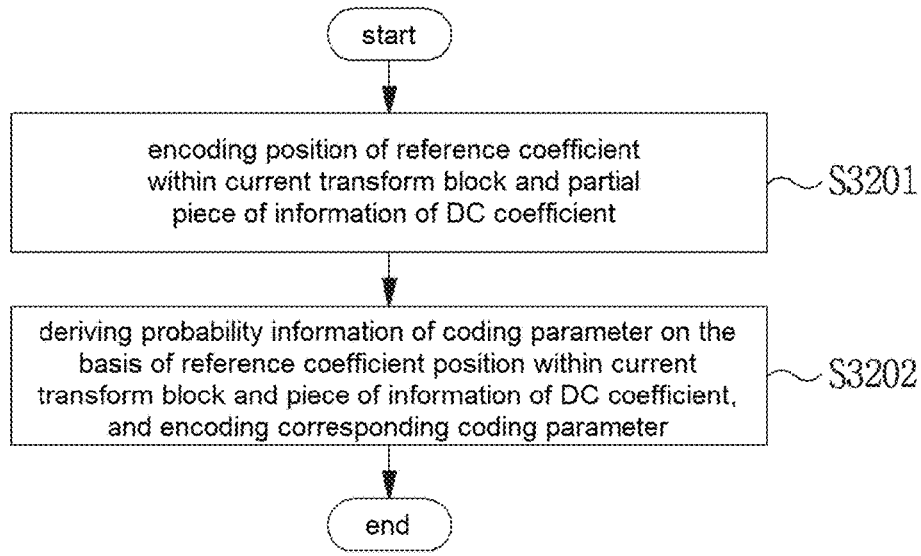
FIG. 32 is a view of an encoding flowchart showing a method of deriving probability information on the basis of a distance between a DC coefficient and a reference coefficient, and a partial piece of information of the DC coefficient.
FIG. 33 is a view showing an example where probability information is differently applied according to information of neighbouring coefficients.

FIG. 32 is a view according to an embodiment of the present invention, and shows a flowchart of a method of deriving and encoding probability information of each coding parameter according to a distance between a DC coefficient and a reference coefficient and a partial piece of information of the DC coefficient. The encoding method of FIG. 32 may be performed by the entropy encoding module 107 of the image encoding device 100.

Referring to FIG. 32, in S3201, the entropy encoding module 107 encodes a position of a reference coefficient of a current transform block. As described above, the reference coefficient may mean the first non-zero coefficient when scanning coefficients in an inverse scan order, but may be determined 200 according to conditions different from each other identically set in the image encoding device 100 and the image decoding device. In S3202, after encoding a partial piece of information of a DC coefficient, probability information of coding parameters is derived on the basis of a distance between the DC coefficient and the reference coefficient, and the partial piece of information of the DC coefficient, and information of the corresponding parameter is encoded.

Herein, the DC coefficient may be a coefficient positioned at the uppermost and leftmost of the transform block, or may be the last non-zero coefficient (coefficient other than 0) in an inverse scan order.

In addition, herein, the partial piece of information of the DC coefficient means a partial piece of information required for encoding and decoding the DC coefficient. For example, the partial piece of information of the DC coefficient may mean at least one of Sig_coeff_flag information of the DC coefficient and Abs_greater1_flag information of the DC coefficient.

Probability information of coding parameters other than the partial piece of information of the DC coefficient may be differently derived within a single probability table on the basis of the distance between the DC coefficient and the reference coefficient, and the partial piece of information of the DC coefficient, and the probability information of the coding parameters may be updated.

Alternatively, on the basis of the distance between the DC coefficient and the reference coefficient, and the partial piece of information of the DC coefficient, probability information of coding parameters may be updated by independently using at least two initial probability tables different from each other, or by independently using the same initial probability table.

Herein, in a method of determining distance information between a DC coefficient and a reference coefficient, distance information may be determined by using the same method that is preset in the encoding/decoding device according to a preset rule, or distance information may be encoded.

A detailed example of the above-described method will be described below.

In order to derive probability information of Sig_coeff_flag information representing whether or not each coefficient within a transform block is 0, encoding is performed by independently using the same three initial probability tables, and Sig_coeff_flag information may be used as the partial piece of information of the DC coefficient. When distance information between the DC coefficient and the reference coefficient is greater than a preset arbitrary threshold value, a table 3300 of FIG. 33 is used, and when distance information between the DC coefficient and the reference coefficient is smaller than a preset arbitrary threshold value, a table 3301 or 3302 of FIG. 33 is used. Herein, the preset arbitrary threshold value may be a value preset in the encoding/decoding device, or may be a value based on information determined in the encoding device and transmitted to the decoding device. Herein, which probability table to use between tables 3301 or 3302 may be determined on the basis of a partial piece of information of the DC coefficient. For example, when Sig_coeff_flag information that is the partial piece of information of the DC coefficient is 1, the table 3301 of FIG. 33 is used, when the same is 0, the table 3302 of FIG. 33 is used so as to determine probability information.

Meanwhile, in a method of determining index information representing which probability to use within the probability table, index information may be determined on the basis of distance information between the DC coefficient and the reference coefficient, and then the determined index information may be corrected on the basis of the partial piece of information of the DC coefficient.

Figure 34:
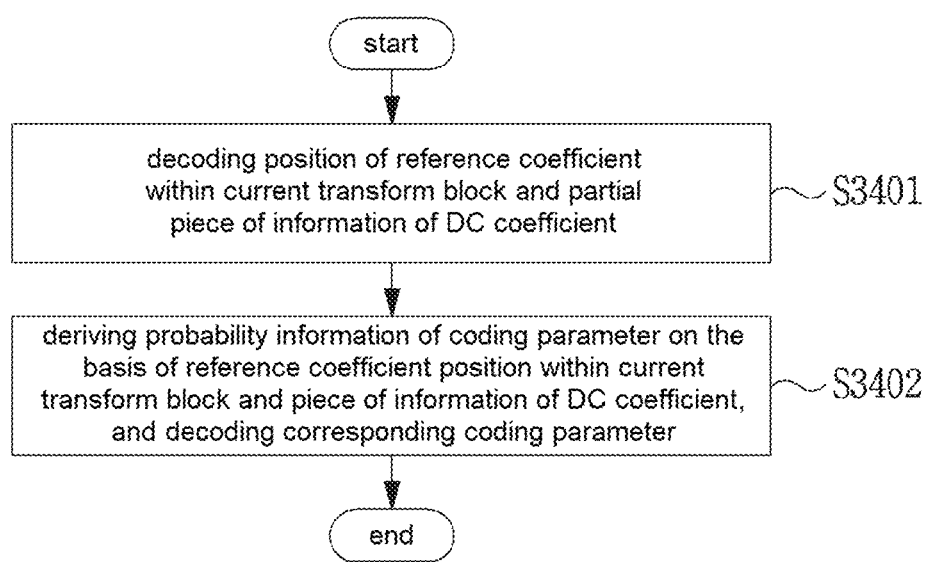
FIG. 34 is a view of a decoding flowchart showing a method of deriving probability information on the basis of a distance between a DC coefficient and a reference coefficient, and a partial piece of information of the DC coefficient.

FIG. 34 is a view according to an embodiment of the present invention, and shows a flowchart of a method of deriving and decoding probability information of each coding parameter according to a distance between a DC coefficient and a reference coefficient, and a partial piece of information of the DC coefficient. The decoding method of FIG. 34 may be performed by the entropy decoding module 201 of the image decoding device 200.

Referring to FIG. 34, in S3401, the entropy decoding module 201 decodes a position of a reference coefficient of a current transform block, and a partial piece of information of a DC coefficient. As described above, the reference coefficient may mean the first non-zero coefficient when scanning coefficients in an inverse scan order, but may be determined according to conditions different from each other identically set in the image encoding device 100 and the image decoding device 200. In addition, in S3402, probability information of coding parameters is derived on the basis of a distance between the DC coefficient and the reference coefficient, and the partial piece of information of the DC coefficient, and information of the corresponding parameter is decoded.

In the image encoding device 100 and the image decoding device 200, an encoding/decoding algorithm may be identical to that of described with reference to FIGS. 29 and 31.

Although the exemplary methods described in the present invention are represented as a series of operations for clarity of description, the order of the steps is not limited thereto. When necessary, the steps may be performed simultaneously or in a different order. In order to realize the method according to the present invention, other steps may be added to the illustrative steps, some steps may be excluded from the illustrative steps, or some steps may be excluded while additional steps may be included The various embodiments of the present invention are not intended to list all possible combinations, but to illustrate representative aspects of the present invention. The matters described in the various embodiments may be applied independently or in a combination of two or more.

Further, the various embodiments of the present invention may be implemented by hardware, firmware, software, or combinations thereof. In the case of implementation by hardware, implementation is possible by one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors, or the like.

The scope of the present invention includes software or machine-executable instructions (for example, an operating system, an application, firmware, a program, or the like) that cause operation according to the methods of the various embodiments to be performed on a device or a computer, and includes a non-transitory computer-readable medium storing such software or instructions to execute on a device or a computer.

INDUSTRIAL APPLICABILITY

The present invention may be used for image encoding/decoding device.

The invention claimed is:

1. A method of decoding an image, the method comprising:
   receiving a bitstream including coefficient information of a current transform block, the coefficient information including absolute value information of a current transform coefficient in the current transform block, the absolute value information indicating whether an absolute value of the current transform coefficient is greater than 3; and
   entropy-decoding the absolute value information of the current transform coefficient from the bitstream,
   wherein entropy-decoding the absolute value information of the current transform coefficient comprises:
      determining probability information of the absolute value information of the current transform coefficient based on significant coefficient flag information of neighboring transform coefficients of the current transform coefficient, the significant coefficient flag information indicating whether a neighboring transform coefficient is non-zero or not; and
      decoding the absolute value information of the current transform coefficient based on the probability information,
   wherein the neighboring transform coefficients include coefficients with coordinates of (x+2, y), (x+1, y+1), and (x, y+2), and
   wherein x and y are representative of coordinates of the current transform coefficient.

2. The method of claim 1, wherein a maximum number of neighboring transform coefficients available to determine the probability information of the absolute value information of the current transform coefficient is five.

3. The method of claim 2, the method further comprising:
   determining a region to which the current transform coefficient belongs among a plurality of regions in the current transform block,
   wherein the probability information of the absolute value information is determined by further considering a position of the region to which the current transform coefficient belongs.

4. The method of claim 3, wherein the current transform block is divided into the plurality of regions according to a distance from a top-left corner coefficient in the current transform block.

5. The method of claim 4, the method further comprising:
   decoding position information of a reference coefficient for the current transform block from the bitstream,
   wherein the probability information of the absolute value information is determined by further considering the position information of the reference coefficient.

6. A method of encoding an image, the method comprising:
   obtaining coefficient information of a current transform block, the coefficient information including absolute value information of a current transform coefficient in the current transform block, the absolute value information indicating whether an absolute value of the current transform coefficient is greater than 3; and
   generating a bitstream by encoding the coefficient information of the current transform block,
   wherein encoding the coefficient information comprises entropy-encoding the absolute value information of the current transform coefficient, and
   wherein entropy-encoding the absolute value information of the current transform coefficient comprises:
      determining probability information of the absolute value information of the current transform coefficient based on significant coefficient flag information of neighboring transform coefficients of the current transform coefficient, the significant coefficient flag information indicating whether a neighboring transform coefficient is non-zero or not; and
      encoding the absolute value information of the current transform coefficient based on the probability information,
   wherein the neighboring transform coefficients include coefficients with coordinates of (x+2, y), (x+1, y+1), and (x, y+2), and
   wherein x and y are representative of coordinates of the current transform coefficient.

7. A non-transitory computer-readable medium storing a bitstream generated by an encoding method, the method comprising:
   obtaining coefficient information of a current transform block, the coefficient information including absolute value information of a current transform coefficient in the current transform block, the absolute value information indicating whether an absolute value of the current transform coefficient is greater than 3; and
   generating a bitstream by encoding the coefficient information of the current transform block,
   wherein encoding the coefficient information comprises entropy-encoding the absolute value information of the current transform coefficient, and wherein entropy-encoding the absolute value information of the current transform coefficient comprises:
  determining probability information of the absolute value information of the current transform coefficient based on significant coefficient flag information of neighboring transform coefficients of the current transform coefficient, the significant coefficient flag information indicating whether a neighboring transform coefficient is non-zero or not; and
  encoding the absolute value information of the current transform coefficient based on the probability information,
wherein the neighboring transform coefficients include coefficients with coordinates of (x+2, y), (x+1, y+1), and (x, y+2), and
wherein x and y are representative of coordinates of the current transform coefficient.

\* \* \* \* \*